(12) United States Patent
Shih et al.

(10) Patent No.: US 11,032,180 B2
(45) Date of Patent: Jun. 8, 2021

(54) SUBSTITUTING WINDOW ENDPOINTS USING A HEALTH MONITOR

(71) Applicant: Microsoft Technology Licensing, LLC, Redmond, WA (US)

(72) Inventors: Sheng-Yao Shih, Taipei (TW); MingChieh Chang, Taipei (TW); Hung-Ju King, Taipei (TW); Yun-Huan Lee, Taipei (TW); Shu-Yu Hu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/597,517

(22) Filed: Oct. 9, 2019

(65) Prior Publication Data

US 2020/0044950 A1 Feb. 6, 2020

Related U.S. Application Data

(63) Continuation of application No. 14/919,375, filed on Oct. 21, 2015, now Pat. No. 10,476,773.

(51) Int. Cl.
| | |
|---|---|
| *H04L 12/26* | (2006.01) |
| *G06F 16/951* | (2019.01) |
| *G06F 11/34* | (2006.01) |
| *G06F 11/20* | (2006.01) |
| *G06F 11/30* | (2006.01) |
| *H04L 12/911* | (2013.01) |

(52) U.S. Cl.
CPC .......... *H04L 43/10* (2013.01); *G06F 11/2025* (2013.01); *G06F 11/2028* (2013.01); *G06F 11/3006* (2013.01); *G06F 11/3055* (2013.01); *G06F 11/3495* (2013.01); *G06F 16/951* (2019.01); *G06F 11/2041* (2013.01); *G06F 11/2048* (2013.01); *H04L 47/70* (2013.01); *H04L 47/748* (2013.01)

(58) Field of Classification Search
None
See application file for complete search history.

(56) References Cited

U.S. PATENT DOCUMENTS

| | | | |
|---|---|---|---|
| 5,781,910 A * | 7/1998 | Gostanian | G06F 11/202 707/610 |
| 2004/0024853 A1 * | 2/2004 | Cates | G06F 16/275 709/223 |
| 2007/0006294 A1 * | 1/2007 | Hunter | G06F 21/606 726/14 |

(Continued)

*Primary Examiner* — James A Edwards
(74) *Attorney, Agent, or Firm* — Michael Best & Friedrich LLP

(57) ABSTRACT

Technologies are described herein for a health monitor that establishes and monitors a set of alive endpoints to be used as substitutes for a dead working window endpoints. The health monitor periodically monitors substitution endpoints. When a request manager determines that a working window endpoint is dead, the request manager sends a request to the health monitor for a substitute endpoint. The health monitor receives the request and identifies an appropriate substitution endpoint from the health monitor endpoints to provide to the request manager to substitute for the dead endpoint. The health monitor releases the identified substitution endpoint to the request manager.

18 Claims, 16 Drawing Sheets

(56) References Cited

U.S. PATENT DOCUMENTS

| | | | | |
|---|---|---|---|---|
| 2007/0180314 A1* | 8/2007 | Kawashima | ........ | G06F 11/3433 |
| | | | | 714/15 |
| 2009/0091468 A1* | 4/2009 | O'Bra | .................... | A45C 13/18 |
| | | | | 340/815.69 |
| 2011/0292163 A1* | 12/2011 | Haltom | ............... | H04L 65/4038 |
| | | | | 348/14.08 |

* cited by examiner

SUBSTITUTING WINDOW ENDPOINTS USING A HEALTH MONITOR

RELATED APPLICATIONS

This application is a continuation of and claims priority to U.S. application Ser. No. 14/919,375 filed Oct. 21, 2015, the entire content of which is incorporated herein by reference.

BACKGROUND

In some distributed computing systems, data can be monitored or provided from one computing resource to another computing resource through an endpoint. An endpoint, for example, can be a server designed to handle data requests received from requesting systems. The data requests can take various forms. The endpoints can be one or more servers designed to handle search queries, provide product information, process payment transactions and the like. Endpoints can also be used to handle enterprise operations for an organization. An organization can provide end users with computing resources from a central source. The end user requests can be handled through the endpoints.

Because of their sometimes integral nature to the workflow of data requests, an endpoint that is not functioning at a required level (e.g. a "dead" endpoint) can hinder or otherwise cease the flow of operations. When an endpoint is dead, for example, a system can experience reduced data processing speeds as other endpoints currently in service handling their data requests can take up data requests directed to the dead endpoint to continue operations. In this example, the performance of the endpoints that take up the additional data requests can be degraded, forcing other endpoints to take up their data requests. The result may be where some endpoints are loaded beyond their expected or desired capacity, potentially causing additional issues.

When a dead endpoint is detected, an administrator can manually locate a substitute endpoint and bring that endpoint online. However, in some examples, this process can be slow and can cause further delay. For example, the health condition of the substitute endpoint, whether the endpoint is a viable endpoint or a dead endpoint, may not be known to the administrator. Thus, the administrator can unknowingly bring a dead endpoint online to substitute for another dead endpoint, causing the administrator to go search for another endpoint.

It is with respect to these and other considerations that the disclosure made herein is presented.

SUMMARY

Technologies are described herein for a health monitor that establishes a set of idle endpoints ("health monitor endpoints") to be used as substitutes for endpoints in a working window ("working window endpoints"). When a working window endpoint transitions from an alive endpoint to a dead endpoint, the health monitor facilitates the substitution of an alive health monitor endpoint for the dead working window endpoint. An "alive" endpoint is an endpoint that is operating within predetermined parameters. A "dead" endpoint is an endpoint that is not operating within predetermined parameters.

The health monitor endpoints can be a subset of idle endpoints available to the health monitor. In some examples, the health monitor may only monitor the status, i.e. whether the endpoints are alive or dead, of the health monitor endpoints. In some examples, the number of health monitor endpoints is at least equal to the number of working window endpoints. The health monitor periodically monitors the health monitor endpoints and substitutes dead endpoints of the health monitor endpoints with alive endpoints of the health monitor endpoints to maintain a desired number of health monitor endpoints.

In some examples, when a request manager receives an input or determines that a working window endpoint is dead, the request manager sends a request to the health monitor for a substitute endpoint. The health monitor receives the request and identifies an appropriate endpoint from the health monitor endpoints to provide to the request manager to substitute for the dead endpoint. Control of the endpoint is shifted to the request manager, which substitutes the dead working window endpoint with the alive health monitor endpoint.

In some examples, a target number of substitution endpoints is established. The target number of substitution endpoints can be based on the number of working window endpoints, working window endpoint capabilities, and the like. If the number of substitution endpoints is not at or within an acceptable range of the target number, the health monitor will check the status of the health monitor endpoints and identify health monitor endpoints as substitution endpoints until the health monitor can meet the target number of substitution endpoints.

It should be appreciated that the above-described subject matter can be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
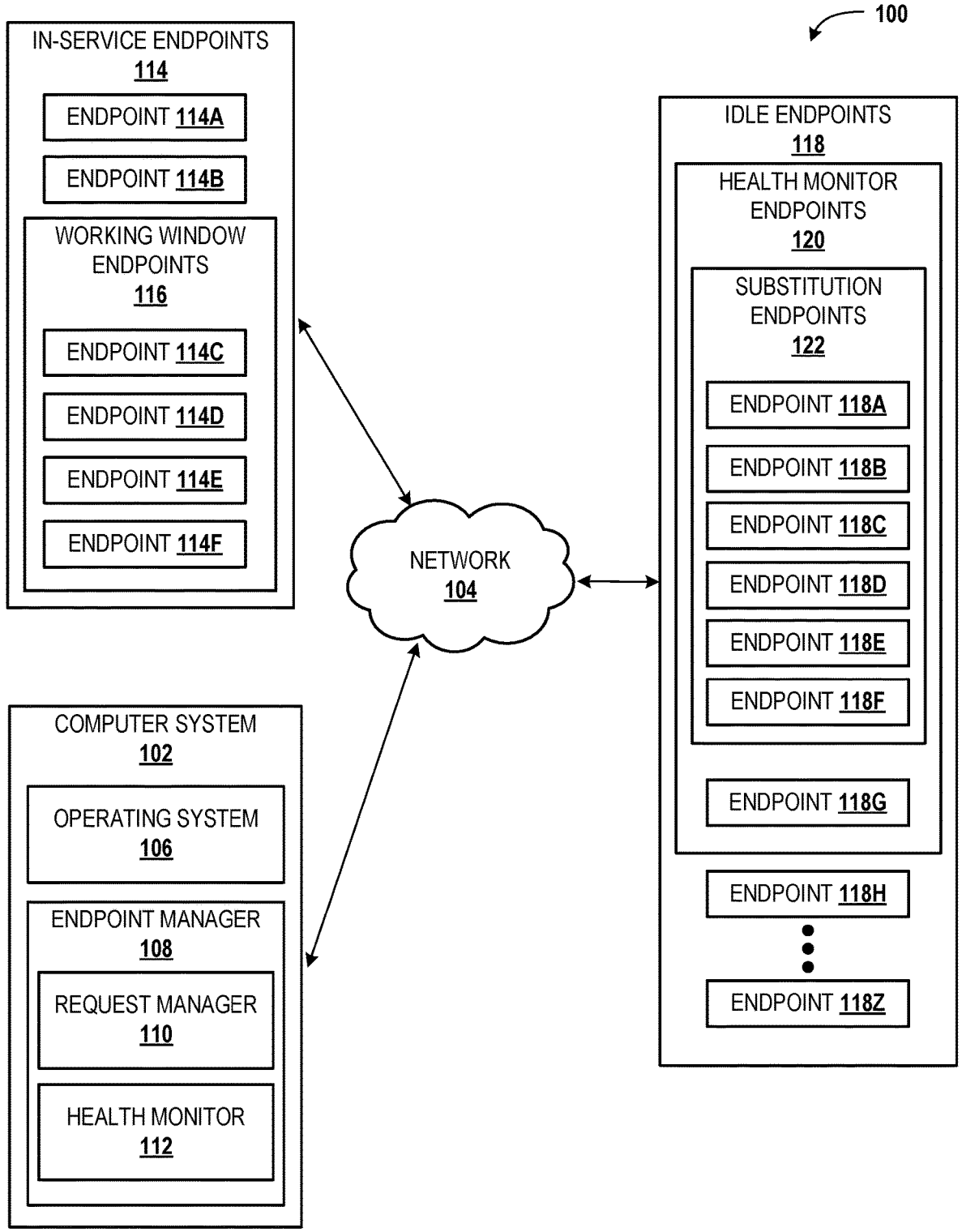
FIG. 1 is a system diagram illustrating an illustrative operating environment for the various examples disclosed herein.

The following detailed description is directed to technologies for a health monitor that establishes and monitors a set of health monitor endpoints to be used as substitutes for working window endpoints. According to the technologies described herein, a computer system executes an endpoint manager. The endpoint manager executes the request manager and the health manager. The request manager can transmit requests to release, or transfer control of, an alive endpoint from the health monitor to the request manager. The health monitor can establish and maintain a set of known, alive endpoints to be used as substitutes for dead endpoints.

In some examples, the use of the health monitor endpoints can reduce processing load of the computer system and increase efficiency of the system. The number of possible, substitute endpoints can be so large that to monitor the substitute endpoints to maintain an accurate accounting of their status, i.e. alive or dead, can significantly increase the load of a system. Monitoring a subset, i.e. the health monitor endpoints, of the possible substitute endpoints can significantly reduce the processing load on a computer system. Further, because the status of the health monitor endpoints is updated periodically, the probability of a dead endpoint inadvertently being placed in service is reduced, thus increasing the efficiency of a system that uses the endpoints. Additionally, in some examples, the requirement of a human user to manually change a dead working window endpoint with a substitute endpoint can be reduced or eliminated.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific examples or examples. Referring now to the drawings, aspects of a computing system, computer-readable storage medium, and computer-implemented methodology for a health monitor that establishes and monitors a set of health monitor endpoints to be used as substitutes for working window endpoints will be presented.

Referring now to FIG. 1, aspects of one operating environment 100 for the various examples presented herein will be described. The operating environment 100 shown in FIG. 1 includes a computer system 102 operating as a part of and/or in communication with a communications network ("network") 104. According to various implementations of the technologies disclosed herein, the functionality of the computer system 102 can be provided by a computing platform that can be provided by one or more application servers, Web servers, data storage systems, network appliances, dedicated hardware devices, and/or other server computers or computing devices.

Some example architectures of the computer system 102 are illustrated and described below. For purposes of illustrating and describing the concepts and technologies disclosed herein, the functionality of the computer system 102 is described herein as being provided by a server computer. In light of the above alternative examples of the computer system 102, it should be understood that this example is illustrative, and should not be construed as being limiting in any way.

The computer system 102 can be configured to execute an operating system 106. The operating system 106 is a computer program for controlling the operation of the computer system 102. The computer system 102 can also be configured to execute one or more application programs, such as the endpoint manager 108, the request manager 110, and the health monitor 112. The application programs are executable programs configured to execute on top of the operating system 106 to provide the functionality described herein for a health monitor that establishes and monitors a set of health monitor endpoints to be used as substitutes for working window endpoints.

In particular, the endpoint manager 108 can be configured to handle the implementation, monitoring, and/or substitution of endpoints, such as in-service endpoints 114A-114F (hereinafter referred to collectively and/or generically as "the in-service endpoints 114" and individually as "the in-service endpoint 114A," "the in-service endpoint 114B," and so forth). The in-service endpoints 114 are endpoints that are designed to, among various possible configurations, handle data requests received from requesting systems or collect data for one system received from another system. It should be noted that although the endpoint manager 108 is illustrated as a module of the computer system 102, along with other modules such as the request manager 110 and the health monitor 112, various functions of the endpoint manager 108 can be provided by one or more other systems not illustrated in FIG. 1.

The endpoint manager 108 can include the request manager 110. The request manager 110 can perform various functions. In some examples, the request manager 110 establishes a set of the in-service endpoints 114 as working window endpoints 116. The working window endpoints 116 are the in-service endpoints 114 that are associated with each other to perform designated functions. For example, the working window endpoints 116 can be the in-service endpoints 114 designated to collect server information from a particular network. In the example illustrated in FIG. 1, the working window endpoints 116 include the in-service endpoints 114C-114F. The in-service endpoints 114A and 114B are not one of the working window endpoints 116. In this example, the in-service endpoints 114A and 114B can be endpoints associated with another working window (not shown).

In some examples, the "window size," i.e. the number of working window endpoints 116, can vary depending on various factors such as the load handled by the working window endpoints 116 or the geographical location of the various working window endpoints 116 in relation to the sources of data or sources of requests handled by the working window endpoints 116. For example, the window size of the working window endpoints 116 in FIG. 1 is four (4), i.e. four endpoints are included as working window endpoints 116. The endpoint manager 108, or other similarly configured component, can increase, decrease, or set the window size depending on the particular needs or configuration of system utilizing the working window endpoints 116.

As noted above, the working window endpoints 116 can be endpoints that are currently in service to handle data requests from one or more client computing devices (not shown). The request manager 110 can periodically monitor the working window endpoints 116 to determine the status of the working window endpoints 116. The monitoring of the working window endpoints 116 can be performed in various ways. For example, the request manager 110 can monitor the working window endpoints 116 in a round-robin fashion whereby the endpoints are queried as to their operational state on a periodic, sequential basis. Another manner in which the request manager 110 can monitor the working window endpoints 116 is to query the health of the working window endpoints 116 in a random fashion. These and other technologies for monitoring the status of the working window endpoints 116 are considered to be within the scope of the presently disclosed subject matter.

In some examples, a number of idle endpoints 118 can be available for use for the request manager 110 (hereinafter referred to collectively and/or generically as "the idle endpoints 118" and individually as "the idle endpoint 118A," "the idle endpoint 118B," and so forth). The idle endpoints 118 can be endpoints that are currently not in use or have capacity to handle additional loads. As such, an endpoint of the idle endpoints 118 does not need to be fully out of use.

The health monitor 112 can allocate a number of the idle endpoints 118 to be health monitor endpoints 120. The health monitor endpoints 120 can be a subset of the idle endpoints that are designated for selection as one or more substitution endpoints 122. The substitution endpoints 122 are the health monitor endpoints 120 that are set aside as substitutes for one or more of the working window endpoints 116. In some examples, the substitution endpoints 122 may be the same number as the health monitor endpoints 120. In other examples, such as the example illustrated in FIG. 1, one of the health monitor endpoints 120 may not be included within the set of the substitution endpoints.

As noted above, the number of substitution endpoints 122 may be at least as great as the number of working window endpoints 116. In some examples, additional health monitor endpoints 120, while designated as a possible substitution endpoint 122, may not actually be set aside as a substitution endpoint 122. These additional health monitor endpoints 120 may be set aside to act as substitutes for one or more of the substitution endpoints 122 should the health monitor 112 determine that one of the substitution endpoints 122 has switched from an alive status to a dead status.

In some examples, the health monitor 112 may monitor and update the status of one or more subsets of the idle endpoints 118. In some examples, the health monitor 112 may monitor and update the status of all of the idle endpoints 118. In other examples, where a reduction in resources used to monitor the idle endpoints 118 is desired, or other reasons not explicitly disclosed herein, the health monitor 112 can monitor and update the status of all of the health monitor endpoints 120 or only the substitution endpoints 122. The presently disclosed subject matter is not limited to any particular process.

As noted above, the substitution endpoints 122 are configured to be substitutes for one or more of the working window endpoints 116 should the one or more working window endpoints 116 come to be dead. In some examples, the number of the substitution endpoints 122 is equal to the number of the working window endpoints 116 to provide for a full substitution of the working window endpoints 116 if necessary. It should be noted, however, that the health monitor 112 can allocate fewer than or greater than a number of the substitution endpoints 122 than the number of working window endpoints 116. For example, the health monitor 112 can establish four idle endpoints 118A-118D to be the substitution endpoints 122.

The health monitor 112 periodically queries the status of the substitution endpoints 122. In some examples, the health monitor 112 will also query the status of the other idle endpoints 118 that are not one of the substitution endpoints 122. Although not limited to any particular reason, querying the status of the other idle endpoints 118, such as the health monitor endpoints 120 not designated as substitution endpoints 122, can provide the health monitor 112 with information should one or more of the substitution endpoints 122 become a dead endpoint.

In some examples, when one of the working window endpoints 116 is determined to be a dead endpoint, the request manager 110 will send a request to the endpoint manager 108 to provide a substitution endpoint 122 to substitute the dead working window endpoint 116 with an alive substitution endpoint 122. The endpoint manager 108 will transmit a query the health monitor 112 to determine a substitute endpoint 122. The request manager 110 will receive the determined substitute endpoint 122 and replace the dead working window endpoint 116 with the alive substitution endpoint 122 determined by the health monitor 112. Examples of the substitution process are described in more detail in FIGS. 2 and 3, below.

As noted above, the health monitor 112 can periodically query the substitution endpoints 122 to determine their status, i.e. alive or dead. The periodic check can occur in various ways. In some examples, the health monitor 112 can have an idle state and an active state. In the idle state, the health monitor 112 is not actively performing any functions. Rather, in the idle state, the health monitor 112 is in a configuration to detect and receive requests from, among other possible components, the request manager 110. Upon receipt of a request or instruction, the health monitor 112 can switch from the idle state to the active state, whereby the health monitor 112 performs certain functions.

In some examples, the health monitor 112 can remain in the idle state, returning to the active state periodically to check the status of the substitution endpoints 122. In some examples, depending on the number of substitution endpoints 122, the check can be performed on different subsets of the substitution endpoints 122 in different iterations. In some examples, during an iteration of status checks, a portion of the health monitor endpoints are checked in parallel. For example, there can be 20 idle endpoints 118 that constitute the substitution endpoints 122. In a first iteration, the health monitor 112 can switch from an idle state to an active state and query the status of the idle endpoint 118A and idle endpoint 118B of the substitution endpoints 122.

After the status of the idle endpoint 118A and idle endpoint 118B is determined, their status can be updated and the health monitor 112 can return to the idle state. After a certain period of time, the health monitor 112 can switch from the idle state to the active state and query the idle endpoint 118C and idle endpoint 118D, and continue the process of updating the status of the substitution endpoints 122. The process can be repeated to continually update the status of the substitution endpoints 122.

In some examples, the time for checking one or more substitution endpoints 122 can be changed. In some examples, endpoints that can be considered stable can have a longer time between checks. Endpoints that have changed their status from dead to alive or from alive to dead can be considered unstable, requiring a higher frequency of status checks. For example, the status check timing an endpoint that just changed from dead to alive can be 20 seconds between the first status check and the second status check, 40 seconds between the second status check and the third status check, and so forth. The time between status checks can be increased up to a maximum time between the status checks.

Figure 2:
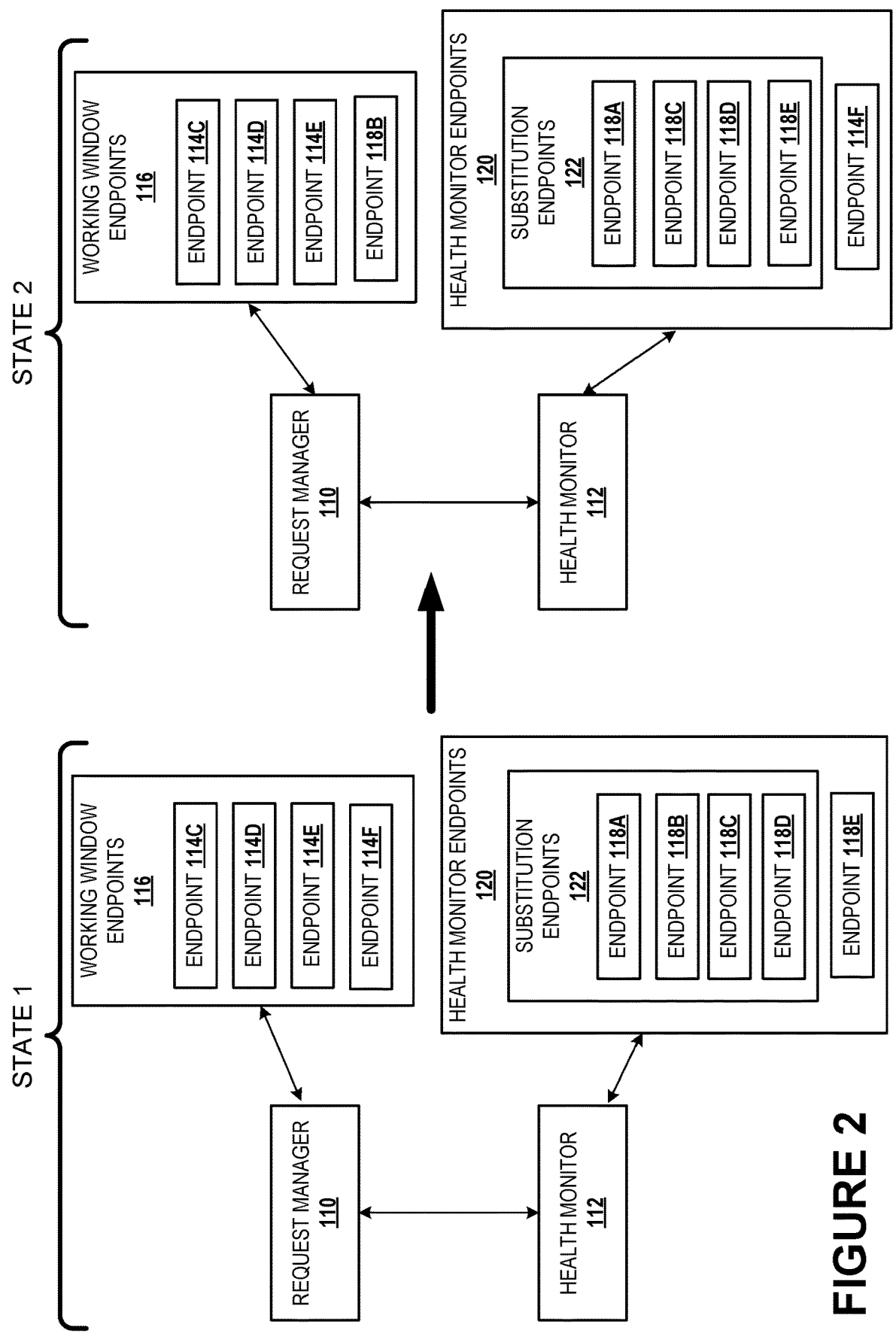
FIG. 2 is an illustration showing the substitution of a dead working window endpoint with an alive health monitor endpoint in which the number of health monitor endpoints is at least equal to the number of working window endpoints.

FIG. 2 is an illustration showing the substitution of a dead working window endpoint with an alive health monitor endpoint in which the number of health monitor endpoints is at least equal to the number of working window endpoints. In FIG. 2, State 1 represents a condition in which the in-service endpoint 114F, which is one of the working window endpoints 116 of FIG. 1, has been detected as being dead. As noted above, an endpoint can be considered dead for various reasons. In one example, the endpoint may not be functioning. In another example, the endpoint may not be able to handle the capacity of data requests assigned to the endpoint.

The request manager 110 will request one of the substitution endpoints 122 with which to replace the in-service endpoint 114F. The health monitor 112, having maintained a status of the substitution endpoints 122, will determine which of the substitution endpoints 122 should act as a substitute for the in-service endpoint 114F.

The determination of the particular substitution endpoint 122 can be made using various criteria. For example, although the idle endpoint 118A, which is one of the substitution endpoints 122, can be designated as the next endpoint to be a substitute, the health monitor 112 can determine that the idle endpoint 118B is more preferable over the idle endpoint 118A. The reasons for choosing which of the substitution endpoints 122 to be the endpoint to act as the substitute endpoint can vary. For example, the idle endpoint 118B can be geographically closer to the in-service endpoint 118D. The idle endpoint 118B can also process data requests faster than the idle endpoint 118A. In other examples, the health monitor 112 can identify the idle endpoint 118B to be used as a substitute on a random basis.

The health monitor 112 determines that the idle endpoint 118B is to become a working window endpoint 116 as a substitute for the in-service endpoint 114F. The idle endpoint 118B is shown in STATE 2 of FIG. 2 as being one of the working window endpoints 116. The in-service endpoint 114F is shown as being taken from service as a working window endpoint 116 and placed as one of the health monitor endpoints 120. In these examples, the in-service endpoint 114F can be configured to be controlled by the health monitor 112 for example. In some examples, the in-service endpoint 114F can be taken out of service and remain under the control of the request manager 110. In other examples, control of in-service endpoint 114F can be received by another entity not illustrated. The presently disclosed subject matter is not limited to any particular configuration. In FIG. 2, the health monitor 112 has added the idle endpoint 118E as one of the substitution endpoints 122 to compensate for the loss of the idle endpoint 118D to maintain the number of substitution endpoints 122 equal to the target number of substitution endpoints 122. In some examples, the target number of substitution endpoints 122 is set based on the number of working window endpoints 116. For example, the target number of substitution endpoints 122 can be equal to the number of working window endpoints 116.

Figure 3A:
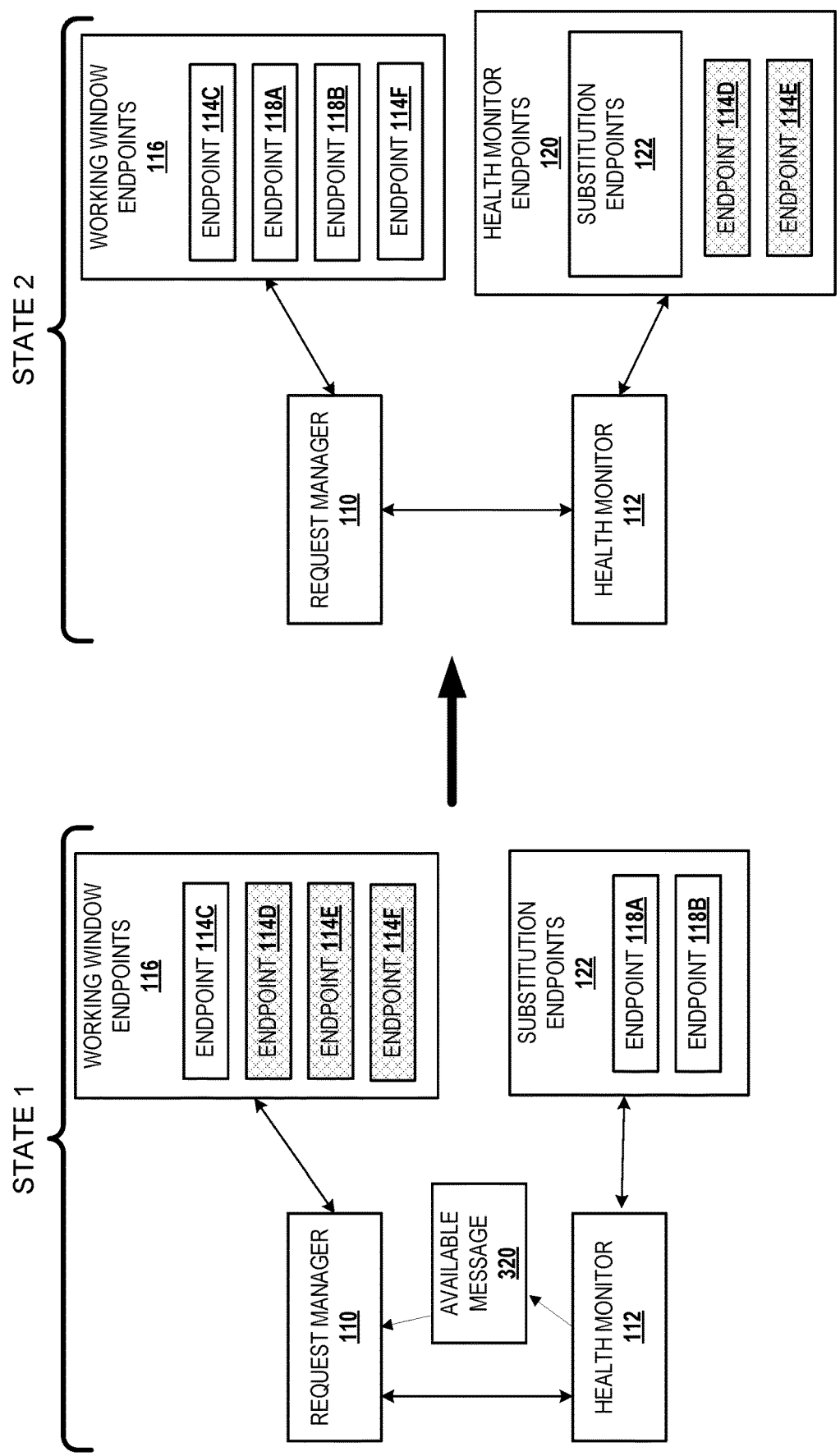
FIGS. 3A-3G are illustrations showing various substitution operations.

FIGS. 3A-3G are illustrations showing various examples of substitution operations. FIG. 3A is an illustration showing a substitution of dead working window endpoints within which the number of health monitor endpoints is less than the number of working window endpoints. In FIG. 3A, State 1 represents a condition in which the in-service endpoints 114D-114F, which are the working window endpoints 116, have been detected as being dead, illustrated using cross-hatching. The request manager 110 requests three substitute substitution endpoints 122 with which to replace the in-service endpoints 114D-114F. The health monitor 112, having maintained a status of the substitution endpoints 122, will determine which of the substitution endpoints 122 to act as substitutes for the in-service endpoints 114D-114F.

As illustrated in FIG. 3A, the number of substitution endpoints 122 is less than the number of working window endpoints 116 to be substituted. In this example, the request manager 110 can determine which of the two working window endpoints 116 determined to be dead can be substituted with the substitution endpoints 122. The request manager 110 can make the determination based on various factors. For example, the request manager 110 can determine that idle endpoint 118A is a preferred substitute for in-service endpoint 114D and idle endpoint 118B is a preferred substitute for in-service endpoint 114E. The number of idle endpoints 118 used as substitution endpoints 122 is reduced to zero until additional idle endpoints 118 are available. This is the condition illustrated in State 2 of FIG. 3A.

In some examples, the request manager 110 can determine that, while considered a dead endpoint, the in-service endpoint 114F is still at least partially functional and return it to service. In similar examples, the request manager 110 can determine that the in-service endpoint 114F was considered dead because of an overload condition. An overload condition can be a state of the endpoint in which the endpoint is tasked to operate beyond the capacity of the endpoint. In some examples, an overload condition is a condition that may clear when the number of tasks is reduced to a level within the capacity of the endpoint. In these examples in which there are an insufficient number of substitution endpoints 122, the request manager 110 can instead maintain the overloaded endpoint as a working window endpoint, illustrated by the removal of the cross-hatching in State 2 of the in-service endpoint 114F. The presently disclosed subject matter is not limited to any particular manner or reason for substituting a particular health monitor endpoint for a working window endpoint.

In some examples, the health monitor 112 can provide a notification to the request manager 110 of the availability of substitution endpoints 122. In some examples, the notification is an available message 320. When the health monitor 112 is unable to provide a certain number of substitute endpoints, the health monitor 112 can transmit an available message 320 to the request manager 110. As used herein, an "available message" is a notification that there is at least one substitution endpoint 122 available to the request manager 110 for substitution. In some examples, the available message 320 is triggered when the health monitor detects that the number of alive and available substitution endpoints 122 changes from zero to one.

The available message 320 can be cleared when the number of alive and available substitution endpoints 122 changes from zero to one. In some examples, the available message 320 is cleared upon notification to the request manager 110 to provide the request manager 110 with timing information. Upon notification, the request manager 110 can perform a check if there are some remaining dead working window endpoints 116 to be substituted. In some examples, the available message 320 is used by the request manager 110 as a status update from the health monitor 112 regarding the availability of substitution endpoints 122. In State 2 of FIG. 3A, the available message 320 is cleared because there are no substitution endpoints 122. Additional examples of the use of the available message 320 are provided in FIGS. 3B-3G, below.

Figure 3B:
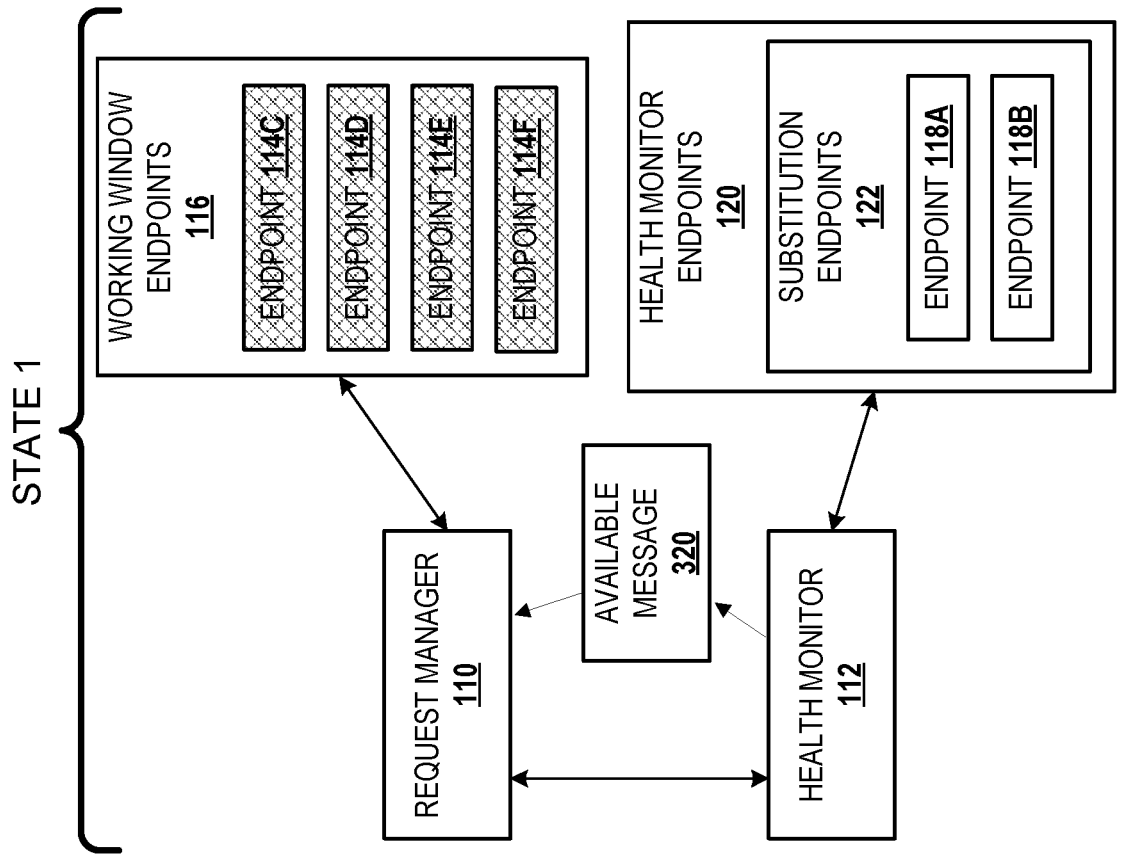

FIGS. 3B-3G are illustrations showing the use of the available message in a substitution operation. In FIG. 3B, the request manager 110 has detected that in-use endpoints 114C-114F are dead, illustrated using cross-hatching. Because of the availability of at least one substitution endpoint 122, the available message 320 has been sent to the request manager 110. Thus, the request manager 110 can send a request to the health monitor 112 for substitution endpoints 122 to substitute for the dead working window endpoints 116. As illustrated in FIG. 3B, the number of substitution endpoints 122 is less than the number of dead working window endpoints 116 to be substituted. The result will be the substitution of fewer than all of the working window endpoints 116 needing to be substituted, illustrated in further detail in FIG. 3C.

Figure 3C:
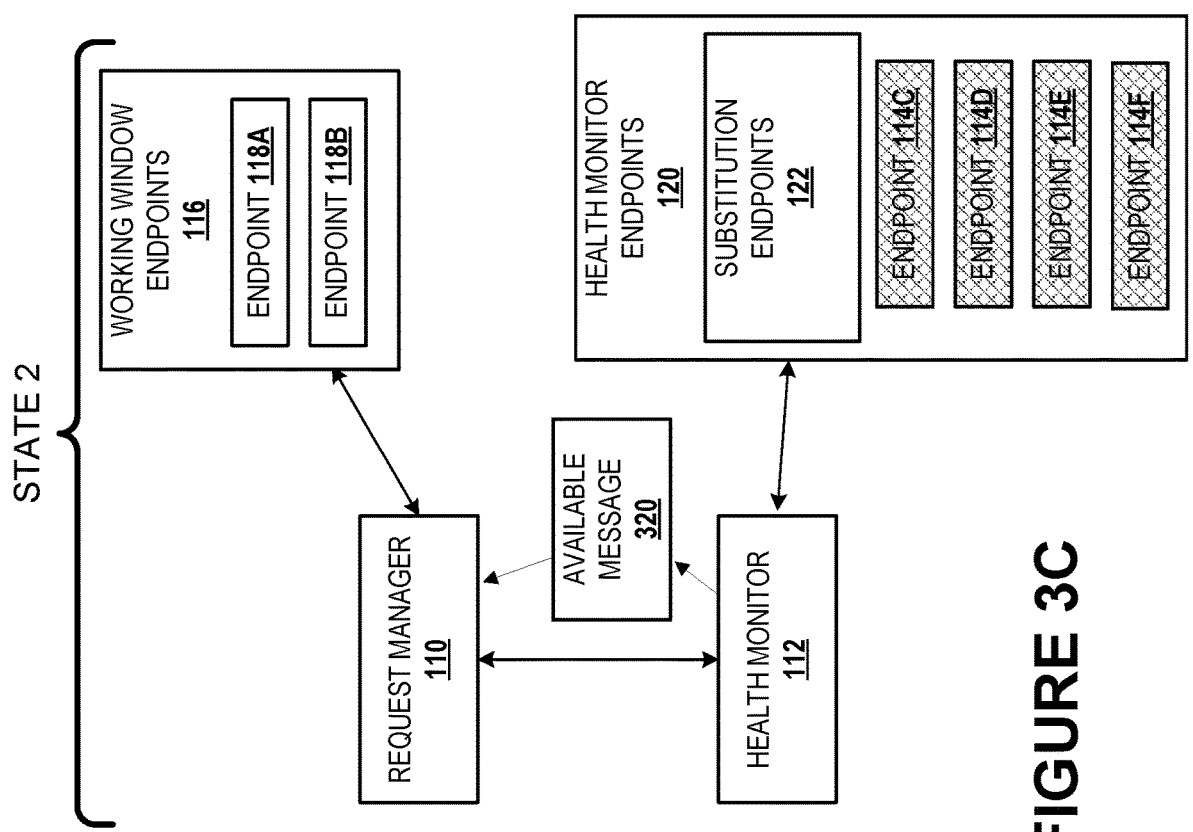

In FIG. 3C, the idle endpoints 118A and 118B of the substitution endpoints 122 have been released to the request manager for use as working window endpoints 116. The dead formerly in-use endpoints 114C-114F are released to the health monitor 112 as health monitor endpoints 120. Because the formerly in-use endpoints 114C-114F are not alive, the formerly in-use endpoints 114C-114F are not released to the health monitor 112 as substitution endpoints 122.

As illustrated in FIG. 3C, the release of the idle endpoints 118A and 118B of the substitution endpoints 122 to the request manager 110 results in no remaining substitution endpoints 122 available for substitution. Thus, the available message 320 is removed. The removal of the available message 320 can be used by the request manager 110 as an indication that no further substitution endpoints 122 are available.

Figure 3D:
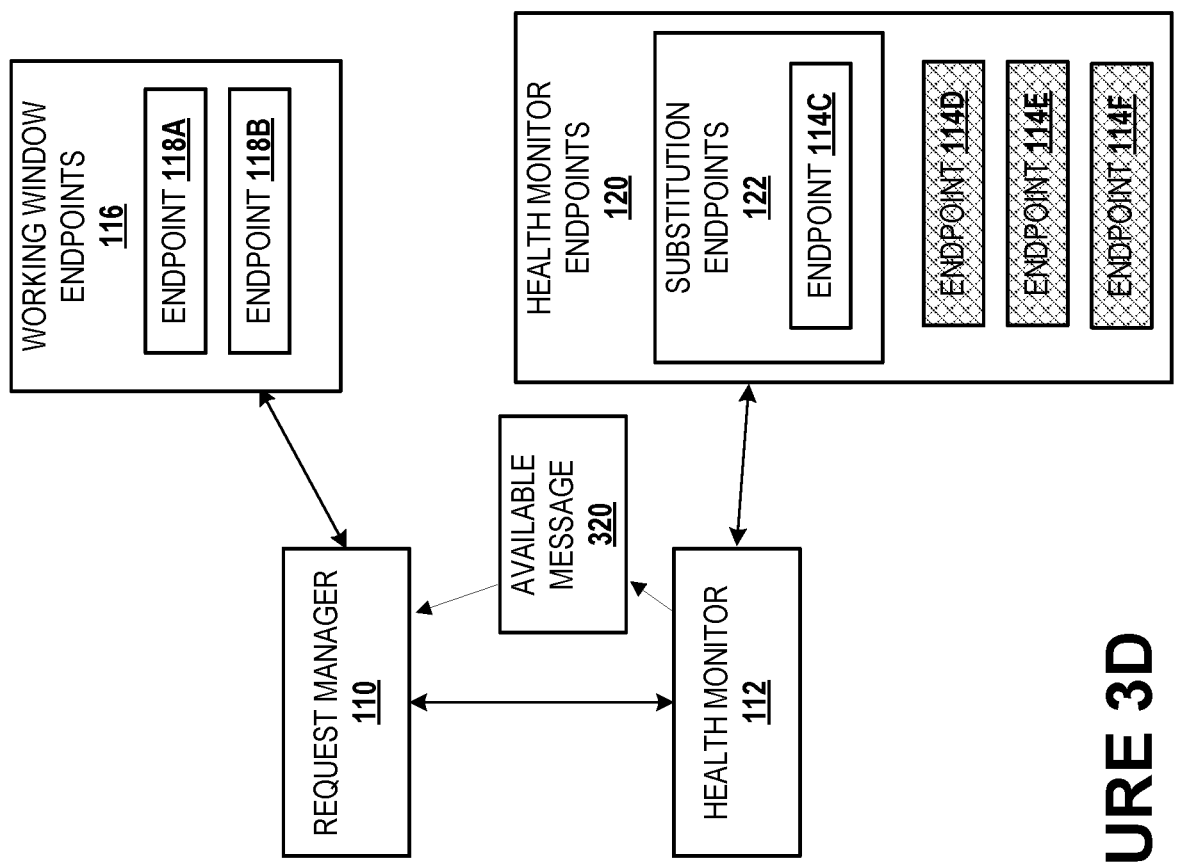
Figure 3E:
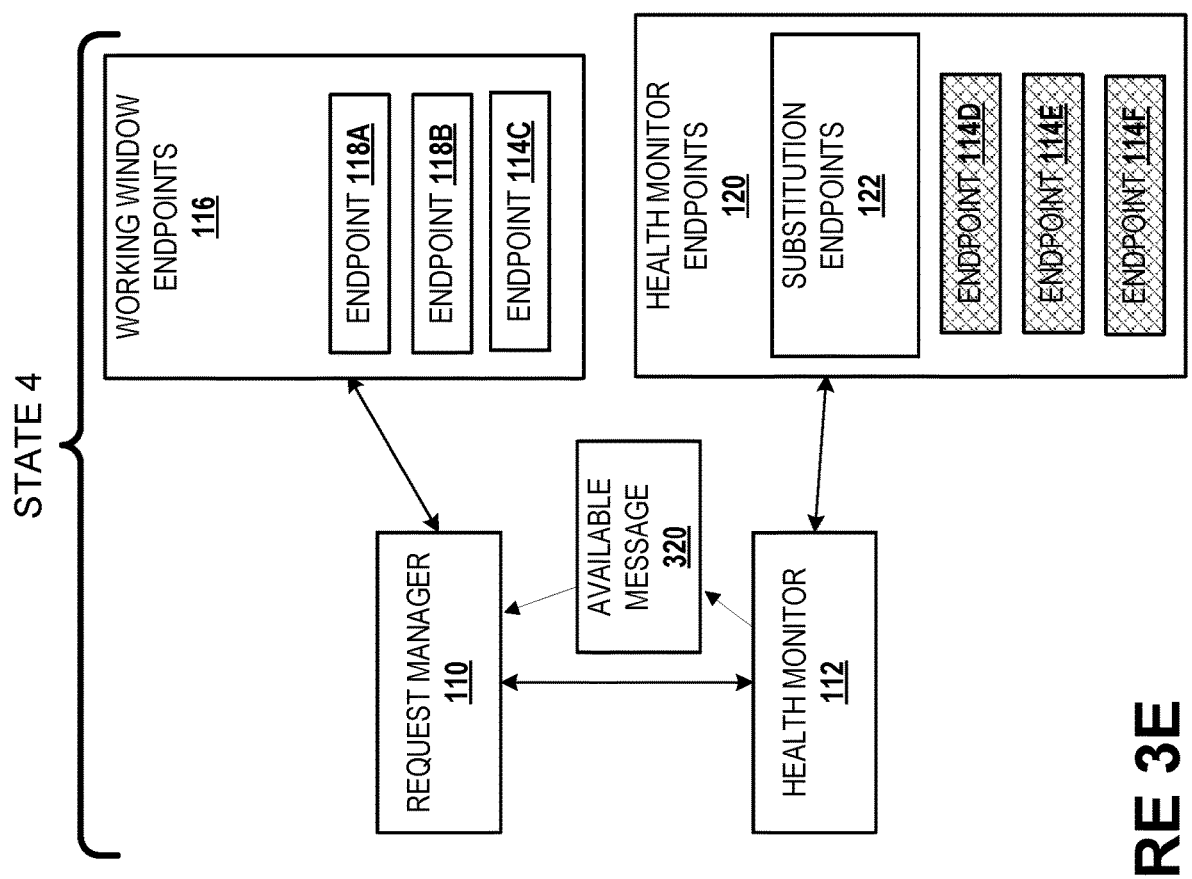

In FIG. 3D, the formerly in-use endpoint 114C has switched from a dead endpoint to an alive endpoint. In this example, the health monitor 112 has designated the formerly in-use idle endpoint 114C as one of the substitution endpoints 122. Because the number of substitution endpoints 122 has increased from zero to one, the available message 320 is transmitted to the request manager 110. In some examples, once the available message 320 is transmitted to the request manager 110, the available message 320 may be cleared. In FIG. 3E, the formerly in-use endpoint 114C has been released to the request manager 110 as one of the working window endpoints 116, resulting in the removal of the available message 320.

Figure 3F:
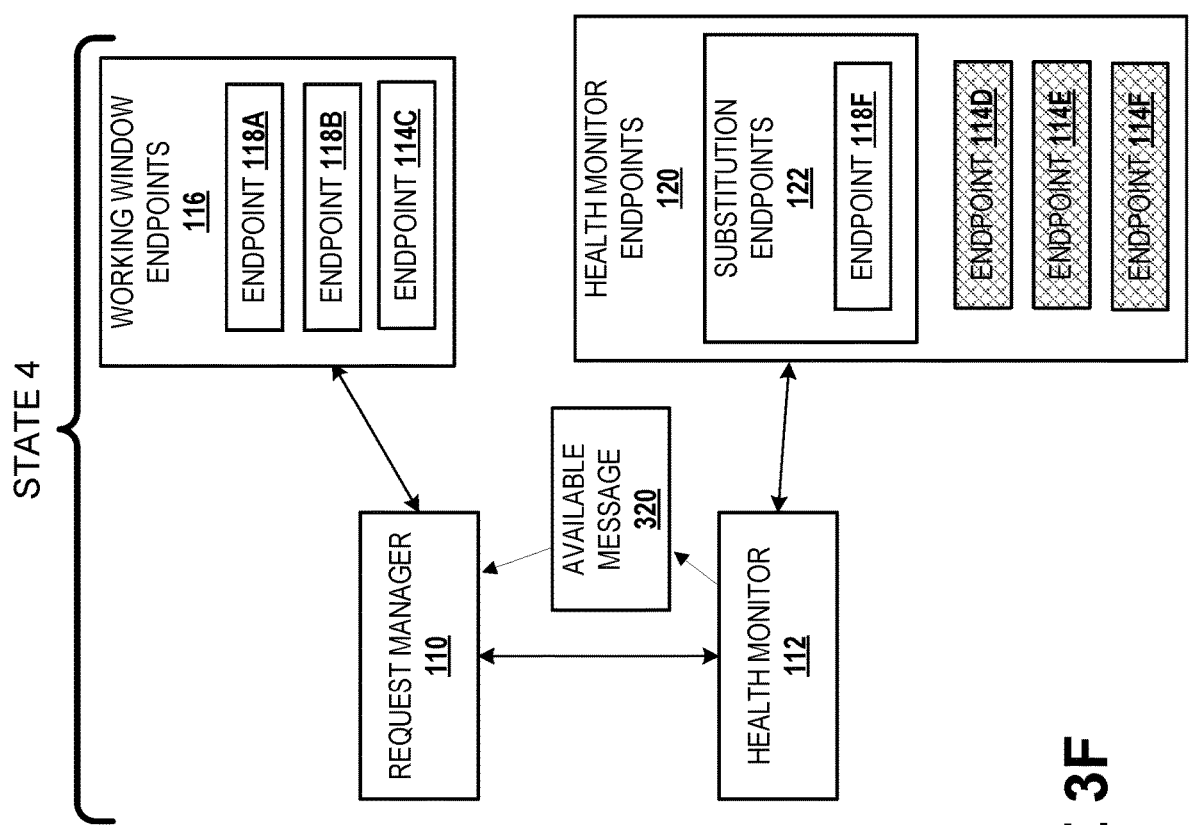
Figure 3G:
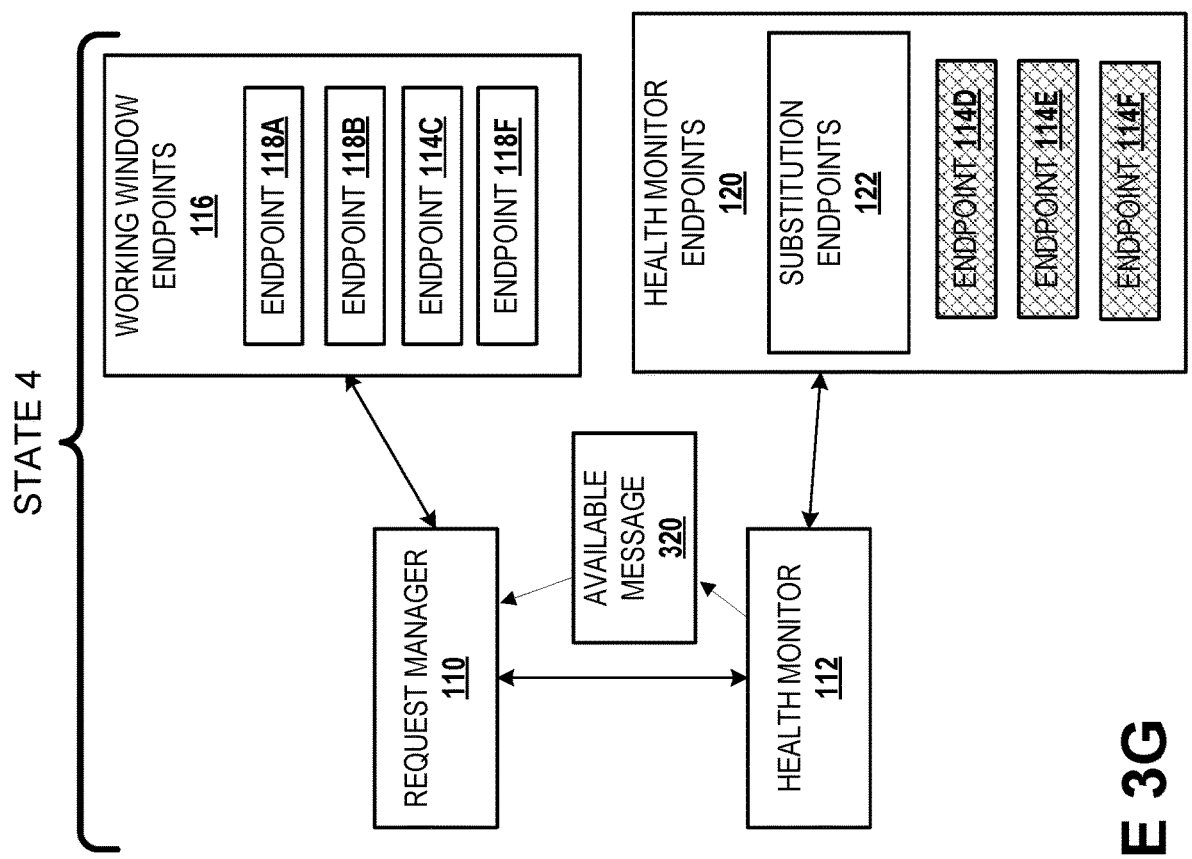

In FIG. 3F, the health monitor 112 has designated the idle endpoint 118F as one of the substitution endpoints 122. The designation results in the available message 320 transmitted to the request manager 110, notifying the request manager 110 of the availability of at least one substitution endpoint 122. In FIG. 3G, the health monitor 112 has released the idle endpoint 118F to the request manager 110 for use as one of the working window endpoints 116. Also as illustrated, because the number of substitution endpoints 122 has reduced back to zero, the available message 320 is removed. As noted above, in some examples, the available message 320 may have been previously cleared upon notification of the availability of substitution endpoints 122 to the request manager 110. In some examples, the health monitor 112 will attempt to find and designate other idle endpoints as substitution endpoints 122 to bring the number of substitution endpoints 122 to at least the number of working window endpoints 116.

Figure 4:
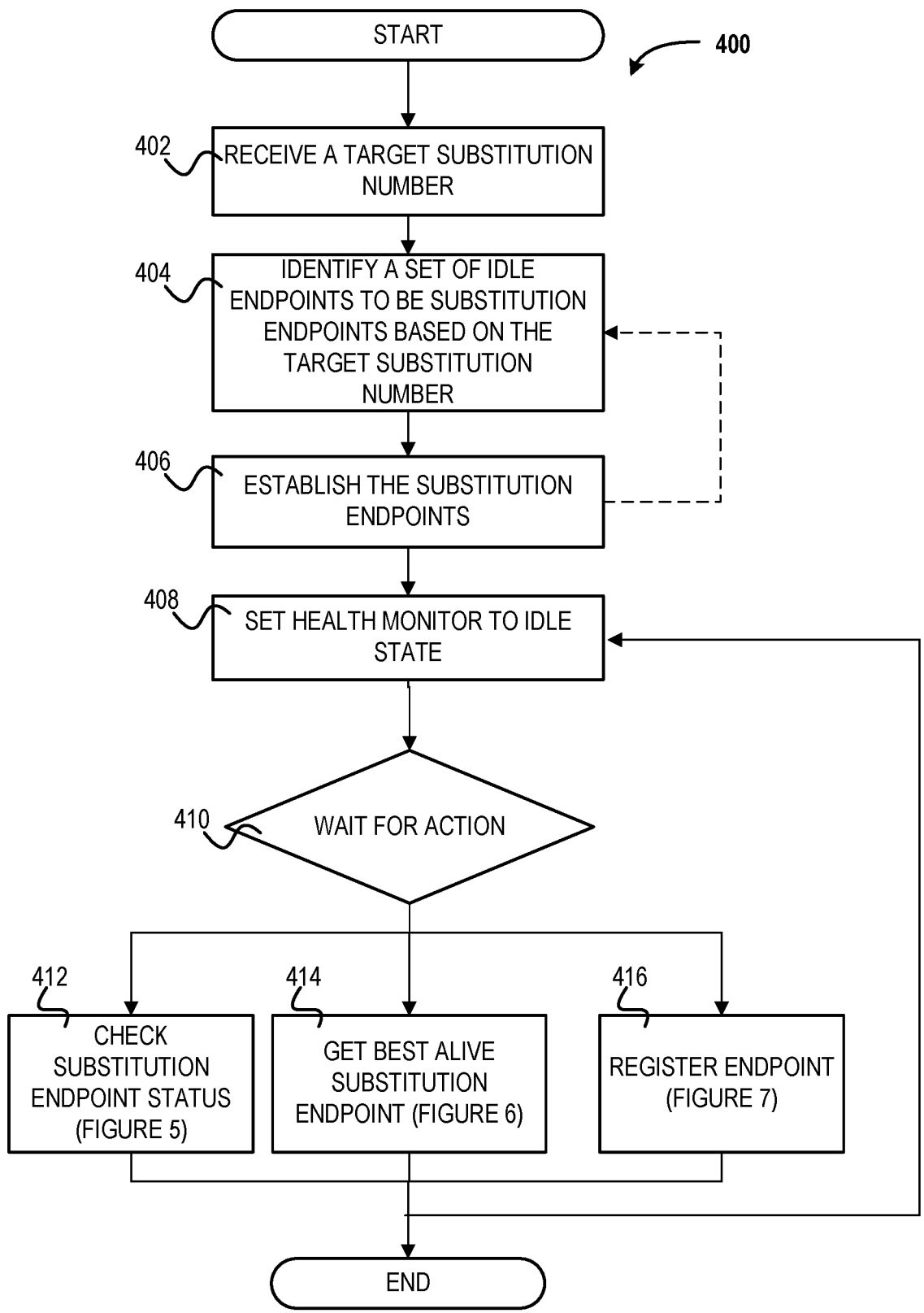
FIG. 4 is a flow diagram showing aspects of a method for providing a health monitor that establishes and monitors a set of health monitor endpoints to be used as substitutes for working window endpoints, according to some illustrative examples.

Turning now to FIG. 4, aspects of a method 400 for providing a health monitor 112 that establishes and monitors a set of substitution endpoints 122 to be used as substitutes for working window endpoints 116 will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations can be added, omitted, and/or performed simultaneously, without departing from the scope of the appended claims.

It also should be understood that the illustrated methods disclosed herein can be ended at any time and need not be performed in their respective (or collective) entireties. Some or all operations of the methods disclosed herein, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules can be implemented in software, in firmware, in special purpose digital logic, and any combination thereof.

For purposes of illustrating and describing the concepts of the present disclosure, the methods disclosed herein are described as being performed by the computer system 102 via execution of one or more software modules such as, for example, the endpoint manager 108, the request manager 110, or the health monitor 112. It should be understood that additional and/or alternative devices and/or network nodes can provide the functionality described herein via execution of one or more modules, applications, and/or other software.

Thus, the illustrated examples are illustrative, and should not be viewed as being limiting in any way.

The method 400 begins at operation 402, where the health monitor 112 receives a target number from the request manager 110. In some examples, the target number can be the number of working window endpoints 116. In other examples, the target number can be defined by another measurement such as, but not limited to, a desired bandwidth capability or processing capability. For example, the target number can be an aggregate network bandwidth such as 100 mbps. The endpoints can be capable of providing a portion of the bandwidth speed, and when aggregated, can provide the full bandwidth speed specified by the working window. The number of endpoints combined to provide the required bandwidth can vary depending on the combined capability of each of the endpoints. The presently disclosed subject matter is not limited to any particular measurement for the target number. In some examples, the health monitor 112 will continually or periodically monitor health monitor endpoints 120 for use as substitution endpoints until the target number is achieved.

At operation 404, the health monitor 112 identifies a set of idle endpoints 118 to be substitution endpoints 122 based on the target number provided by the request manager 110. As noted in examples provided above, the number of idle endpoints 118 identified can be equal to the number of working window endpoints 116. In other examples, the number of idle endpoints 118 identified can be a number sufficient to provide a particular processing capability. The presently disclosed subject matter is not limited to any particular configuration.

At operation 406, the health monitor 112 establishes the identified idle endpoints 118 as the substitution endpoints 122. As noted above, in some configurations, the number of substitution endpoints 122 can equal the number of working window endpoints 116. In some examples, however, the number of substitution endpoints 122 can be less than the number of working window endpoints 116. In these examples, the method 400 can return to operation 404 (illustrated by the dashed line in FIG. 4), where the health monitor 112 continues to identify idle endpoints 118 in an attempt to increase the number of substitution endpoints 122 to be equal to the number of working window endpoints 116. In some examples, this process can be performed while the method 400 continues to operation 408.

At operation 408, the health monitor 112 is set to the idle state. In the idle state, the health monitor 112 is a passive entity configured to detect and receive requests from, among other possible components, the request manager 110. In some examples, setting the health monitor 112 to the idle state can help reduce energy usage, increase equipment life, and reduce network bandwidth usage.

At operation 410, the health monitor 112 is configured to wait for an action after being set to the idle state in 408. Examples of actions include operation 412 where the health monitor 112 checks endpoint status (FIG. 5), operation 414 where the health monitor 112 receives a get best alive message from the request manager 110 (FIG. 6), and operation 416 where the health monitor 112 registers an endpoint (FIG. 7). The method 400 can return to operation 408 once one of the actions is performed or can thereafter end.

Figure 5:
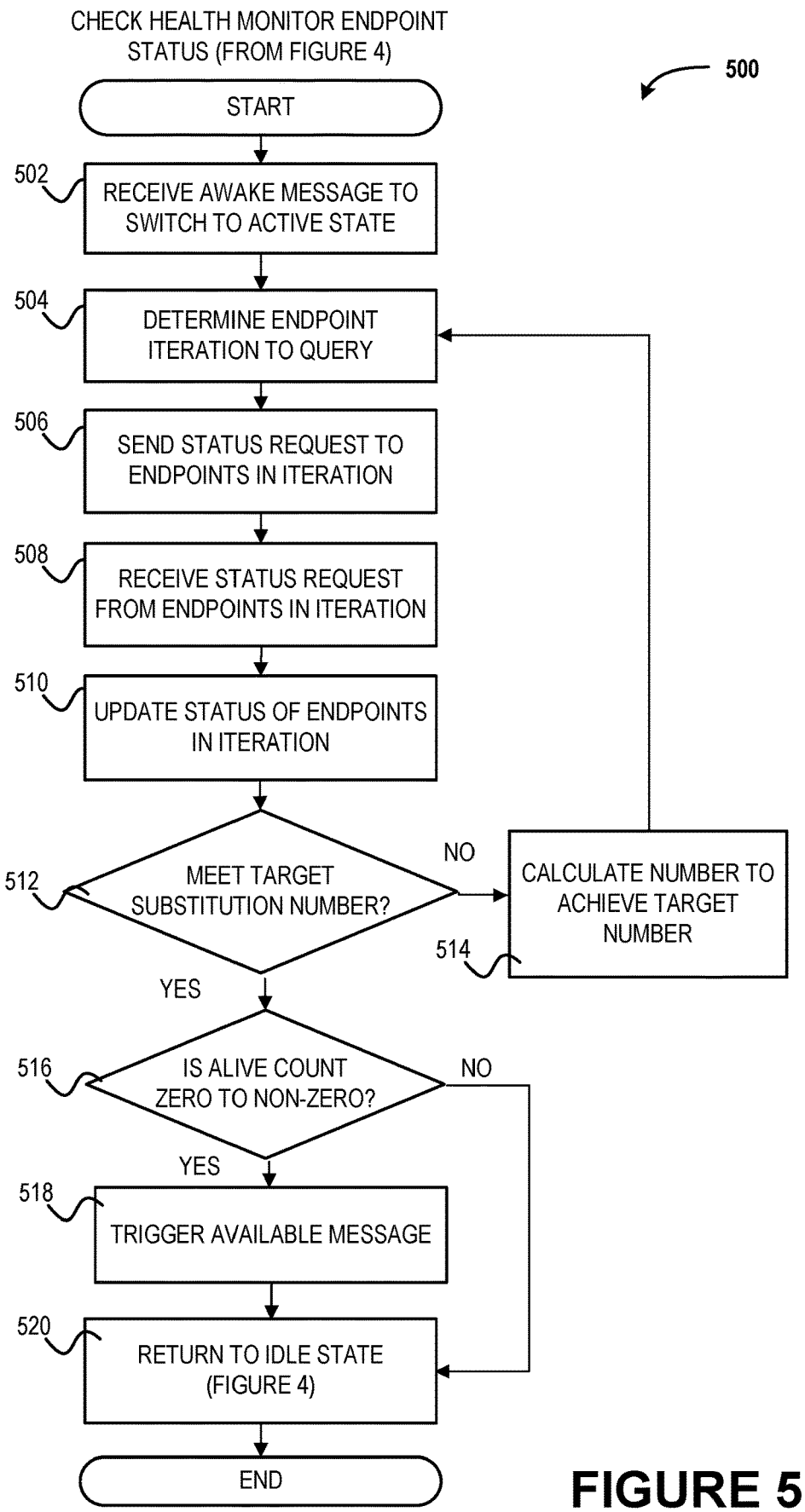
FIG. 5 is a flow diagram showing aspects of a method for checking the status of a health monitor endpoint, according to some illustrative examples.

FIG. 5 illustrates a method 500 for checking the status of one of more of the substitution endpoints 122. In some examples, the health monitor 112 can periodically check the status of the substitution endpoints 122. In some examples, depending on the number of endpoints that are the substitution endpoints 122, the check can be performed on different subsets of the substitution endpoints 122 in different iterations.

At operation 502, the health monitor 112 receives an awake message. The awake message can be periodically generated by the endpoint manager 108 to cause the health monitor 112 to switch from the idle state to the active state. The timing of the awake message can vary, but can be based on a desired time to query the status of the substitution endpoints 122.

At operation 504, the health monitor 112 determines the substitution endpoints 122 to be queried. In some examples, the substitution endpoints 122 can be processed in different iterations. For example, there can be 20 idle endpoints 118 constituting the substitution endpoints 122. In a first iteration, the health monitor 112 can switch from an idle state to an active state and query the status of the first five idle endpoints 118 forming the substitution endpoints 122.

At operation 506, the health monitor 112 transmits a status request to the substitution endpoints 122 in the current iteration. The status request can vary. For example, the status request can be a request to provide an update to the health monitor 112 as to whether or not the endpoint is functioning. In another example, the status request can include the present capabilities of the endpoint.

At operation 508, the health monitor 112 receives the status request from the substitution endpoints 122 queried in the current iteration. At operation 510, the health monitor 112 updates the status of the queried substitution endpoints 122.

At operation 512, a determination is made as to whether or not the number of substitution endpoints 122 meets the target number. If the number of substitution endpoints 122 does not meet the target number, the method continues to operation 514. If the number of substitution endpoints meets the target number, the method 500 continues to operation 516.

At operation 514, a calculation is performed to determine the number of substitution endpoints 122 needed to meet the target number. In some examples, the calculation is the target number minus the number of substitution endpoints 122. The calculation of operation 514 is performed, causing the method 500 to return to operation 504. In some examples, the return to operation 504 represents an attempt by the health monitor 112 to find idle endpoints 118 to act as substitution endpoints 122 to meet the target number.

At operation 516, a check is determined if the number of alive substitution endpoints 122 has increased from zero to at least one. If the check is negative, the method continues to operation 520, whereby the health monitor 112 is returned to an idle state.

If the check of operation 516 is positive, the available message 320 is triggered at operation 518 and transmitted to the request manager 110. The method continues to operation 520, whereby the health monitor 112 is returned to an idle state. The method 500 thereafter ends.

Figure 6:
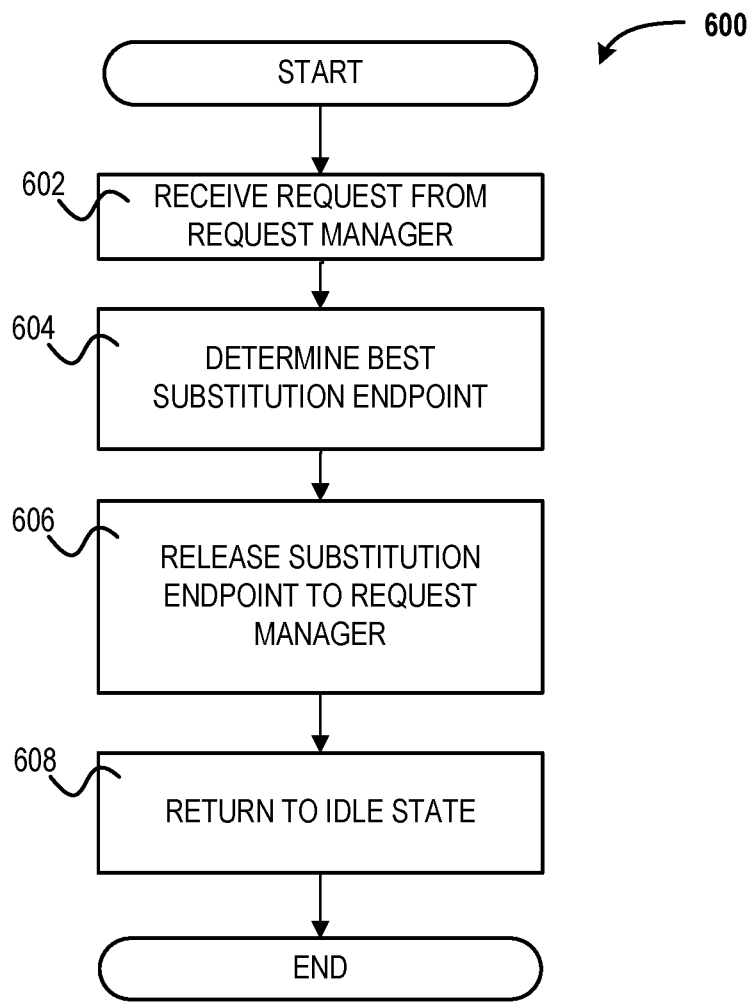
FIG. 6 is a flow diagram showing aspects of a method for transferring a health monitor endpoint to the request manager for use as a working window endpoint.
Figure 7:
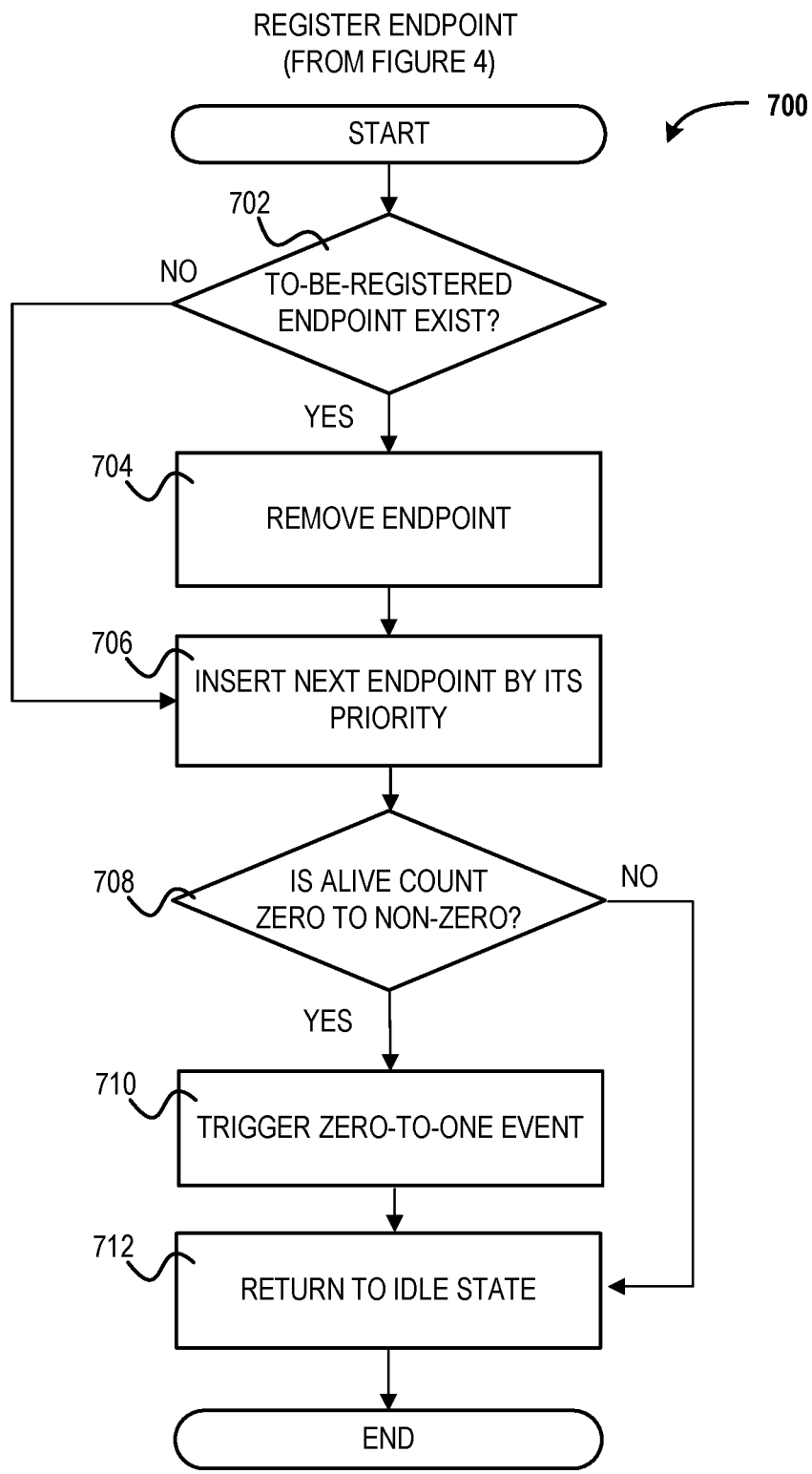
FIG. 7 is a flow diagram showing aspects of a method for registering a health monitor endpoint.

FIG. 6 illustrates a method 600 for transferring one of the substitution endpoints 122 to the request manager 110 for use as a working window endpoint 116. In some examples, the request manager 110 can request a "best" substitution endpoint 122 rather than any substitution endpoint 122. As noted above, the "best" substitution endpoint 122 can be identified based upon the factors against which the substitution endpoints 122 are measured.

For example, the geographically closest substitution endpoint 122 to the working window endpoint 116 to be replaced can be a "best" endpoint. In another example, the substitution endpoint 122 having the largest available bandwidth or processing capability can be deemed the "best" endpoint. In a still further example, the first substitution endpoint 122 in a queue can be deemed the "best" endpoint. These and other examples are considered to be within the scope of the presently disclosed subject matter.

Method 600 begins at operation 602, where the health monitor 112 receives a request from the request manager 110. The request can be in the form of a "get best alive" request, whereby the request manager 110 requests a "best" substitution endpoint 122.

At operation 604, the health monitor 112 determines which of the substitution endpoints 122 is a "best" health monitor endpoint 120. As noted above, there can be various criteria for determining a "best" substitution endpoint 122. In some examples, however, the request manager 110 can request only that one of the substitution endpoints 122 be provided, without any criteria such as "best."

At operation 606, the health monitor 112 releases to the request manager 110 the substitution endpoint 122 determined to meet the criteria set forth by the request manager 110. At operation 608, the health monitor 112 is returned to an idle status. The method 600 thereafter ends.

FIG. 7 illustrates a method 700 for registering a health monitor endpoint 120. In some examples, the health monitor 112 conducts a registration process to maintain an active list of the substitution endpoints 122.

The method 700 commences at operation 702, where a determination is made as to whether or not a to-be-registered endpoint exists. The to-be-registered endpoint can be an endpoint that is requested to be placed in service by the request manager 110. In this manner, the registration process can be conducted by or on behalf of the request manager 110.

At operation 702, if the to-be-registered endpoint exists, at operation 704, the health monitor 112 removes the endpoint from the substitution endpoints 122. At operation 702, if the to-be-registered endpoint does not exist, at operation 706, the health monitor 112 inserts a next of the substitution endpoints 122 by its priority as possible candidates to be registered by or on behalf of the request manager 110.

At operation 708, a check is determined if the number of alive substitution endpoints 122 has increased from zero to at least one. If the check is negative, the method continues to operation 710, whereby the health monitor 112 is returned to an idle state.

If the check of operation 708 is positive, the available message 320 is triggered at operation 710 and transmitted to the request manager 110. The method continues to operation 712, whereby the health monitor 112 is returned to an idle state. The method 700 thereafter ends.

Figure 8:
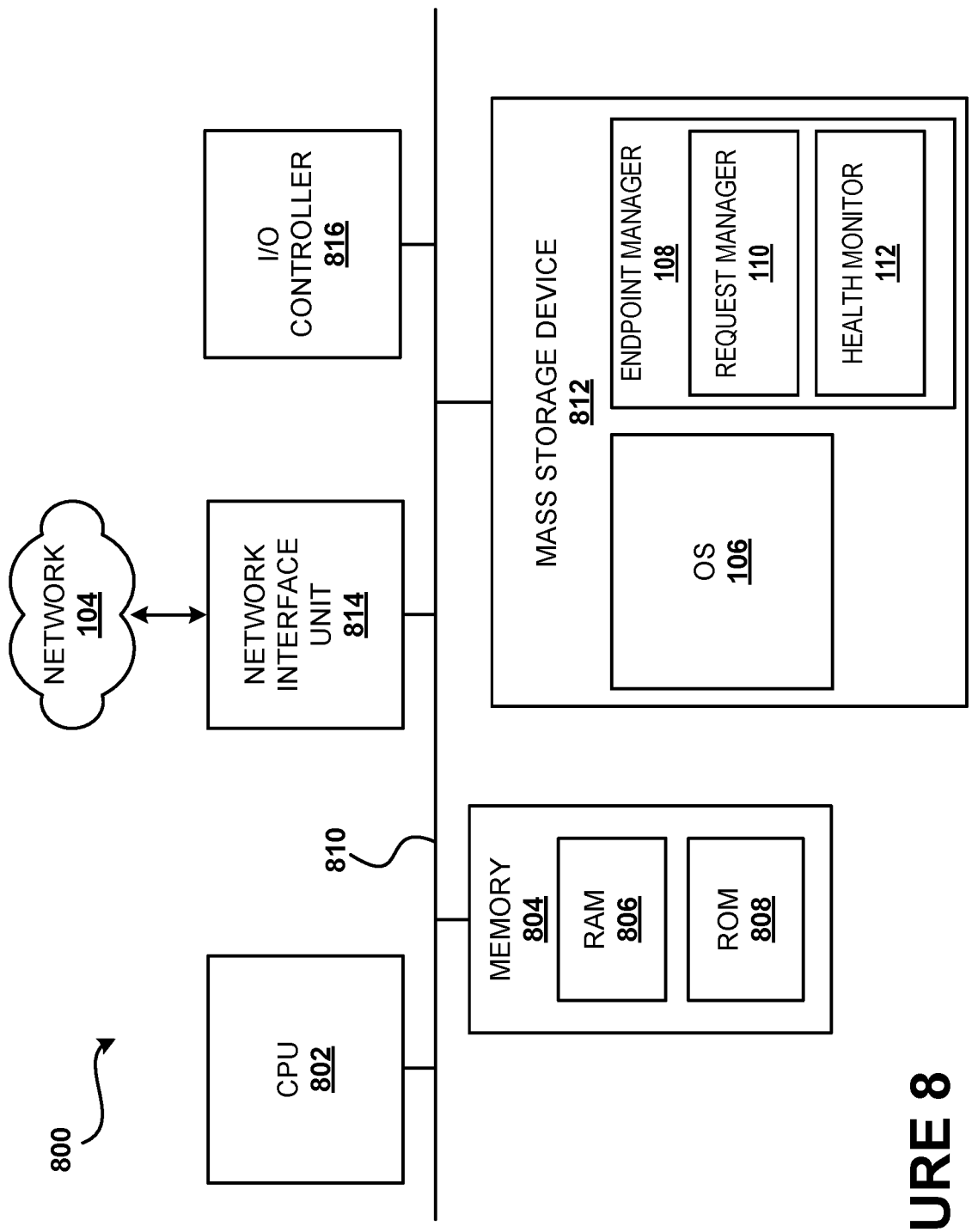
FIG. 8 is a computer architecture diagram illustrating an illustrative computer hardware and software architecture for a computing system capable of implementing aspects of the examples presented herein.

FIG. 8 illustrates an illustrative computer architecture 800 for a device capable of executing the software components described herein for a health monitor that establishes and monitors a set of health monitor endpoints to be used as substitutes for working window endpoints. Thus, the computer architecture 800 illustrated in FIG. 8 illustrates an architecture for a server computer, mobile phone, a PDA, a smart phone, a desktop computer, a netbook computer, a tablet computer, and/or a laptop computer. The computer architecture 800 can be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing the operating system 106 and one or more application programs including, but not limited to, the endpoint manager 108, the request manager 110, the health monitor 112, other application programs, or the like.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media can include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 800. For purposes of the claims, the phrase "computer storage medium," and variations thereof, does not include waves or signals per se and/or communication media.

According to various examples, the computer architecture 800 can operate in a networked environment using logical connections to remote computers through a network such as the network 104. The computer architecture 600 can connect to the network 104 through a network interface unit 814 connected to the bus 810. It should be appreciated that the network interface unit 814 also can be utilized to connect to other types of networks and remote computer systems. The computer architecture 800 also can include an input/output controller 816 for receiving and processing input from a number of other devices, including a keyboard, mouse, or electronic stylus (not shown in FIG. 8). Similarly, the input/output controller 816 can provide output to a display screen, a printer, or other type of output device (also not shown in FIG. 8).

It should be appreciated that the software components described herein can, when loaded into the CPU 802 and executed, transform the CPU 802 and the overall computer architecture 800 from a general-purpose computing system into a special-purpose computing system customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 can include other types of computing devices, including hand-held computers, embedded computer systems, personal digital assistants, and other types of computing devices known to those skilled in the art. It is also contemplated that the computer architecture 800 may not include all of the components shown in FIG. 8, can include other components that are not explicitly shown in FIG. 8, or can utilize an architecture completely different than that shown in FIG. 8.

Figure 9:
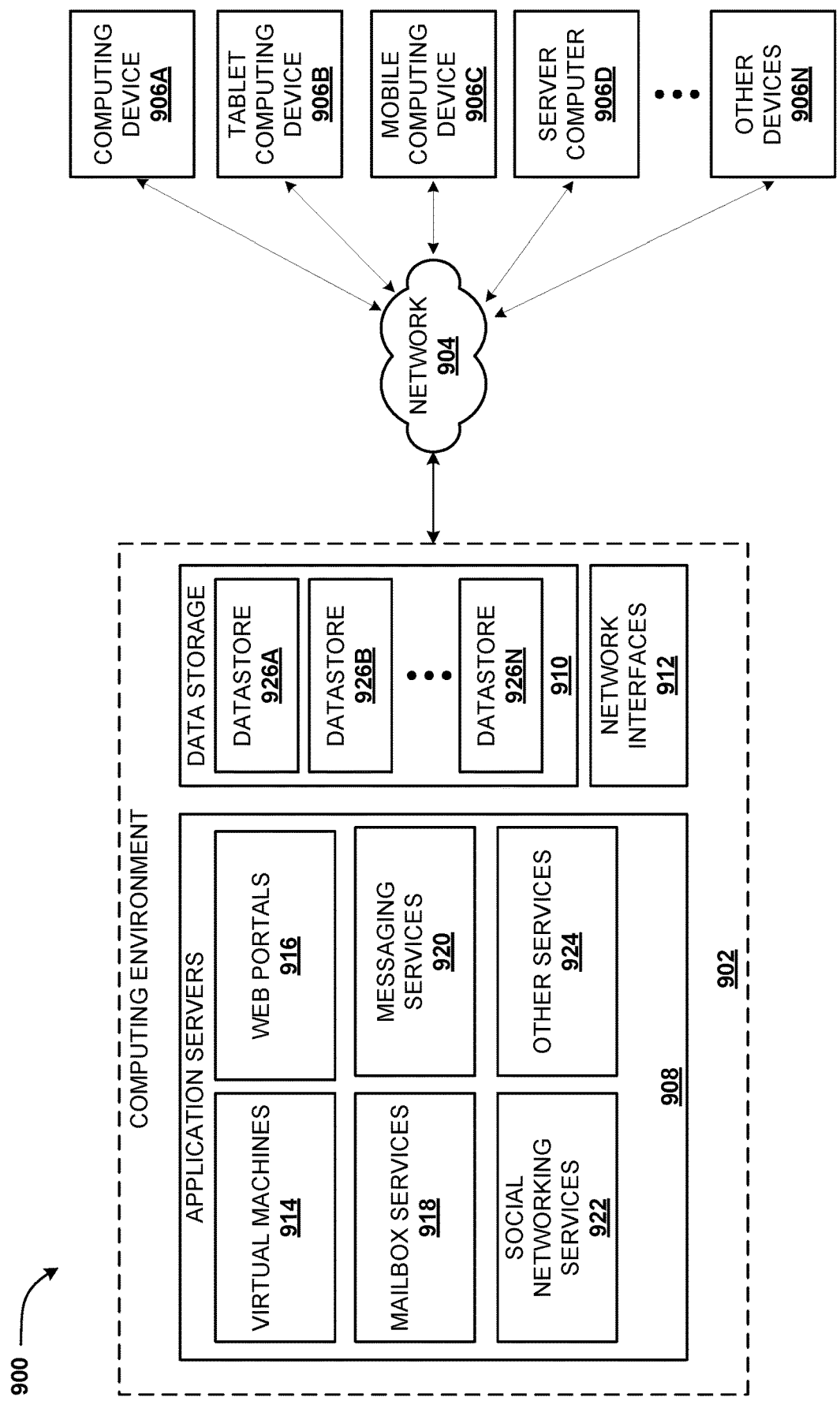
FIG. 9 is a diagram illustrating a distributed computing environment capable of implementing aspects of the examples presented herein.

FIG. 9 illustrates an illustrative distributed computing environment 900 capable of executing the software components described herein for a health monitor that establishes and monitors a set of health monitor endpoints to be used as substitutes for working window endpoints. Thus, the distributed computing environment 900 illustrated in FIG. 9 can be used to provide the functionality described herein with respect to the computer system 102. The distributed computing environment 900 thus can be utilized to execute any aspects of the software components presented herein.

According to various implementations, the distributed computing environment 900 includes a computing environment 902 operating on, in communication with, or as part of a network 904. The network 904 also can include various access networks. According to various implementations, the functionality of the network 904 can be provided by the network 104 illustrated in FIG. 1. One or more client devices 906A-906N (hereinafter referred to collectively and/or generically as "clients 906") can communicate with the computing environment 902 via the network 904 and/or other connections (not illustrated in FIG. 9). In the illustrated example, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein with reference to FIGS. 8 and 10. It should be understood that the illustrated clients 906 and computing architectures illustrated and described herein are illustrative, and should not be construed as being limited in any way.

In the illustrated example, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated example, the application servers 908 host one or more virtual machines 914 for hosting applications or other functionality. According to various implementations, the virtual machines 914 host one or more applications and/or software modules for providing the functionality described herein for generating queries for data points in a spreadsheet application. It should be understood that this example is illustrative, and should not be construed as being limiting in any way. The application servers 908 also host or provide access to one or more Web portals, link pages, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services.

The application servers 908 also can include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some examples, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other examples, the social networking services 922 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above examples are illustrative, and should not be construed as being limited in any way.

As shown in FIG. 9, the application servers 908 also can host other services, applications, portals, and/or other resources ("other resources") 924. It can be appreciated that the computing environment 902 can provide integration of the technologies disclosed herein for a health monitor that establishes and monitors a set of health monitor endpoints to be used as substitutes for working window endpoints with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 908 and/or other data.

The computing environment 902 can communicate with, or be accessed by, the network interfaces 912. The network interfaces 912 can include various types of network hardware and software for supporting communications between two or more computing devices including, but not limited to, the clients 906 and the application servers 908. It should be appreciated that the network interfaces 912 also can be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the clients 906. It should be understood that the clients 906 can include real or virtual machines including, but not limited to, server computers, web servers, personal computers, mobile computing devices, smart phones, and/or other devices. As such, various examples of the concepts and technologies disclosed herein enable any device configured to access the distributed computing environment 900 to utilize the functionality described herein for a health monitor that establishes and monitors a set of health monitor endpoints to be used as substitutes for working window endpoints.

Figure 10:
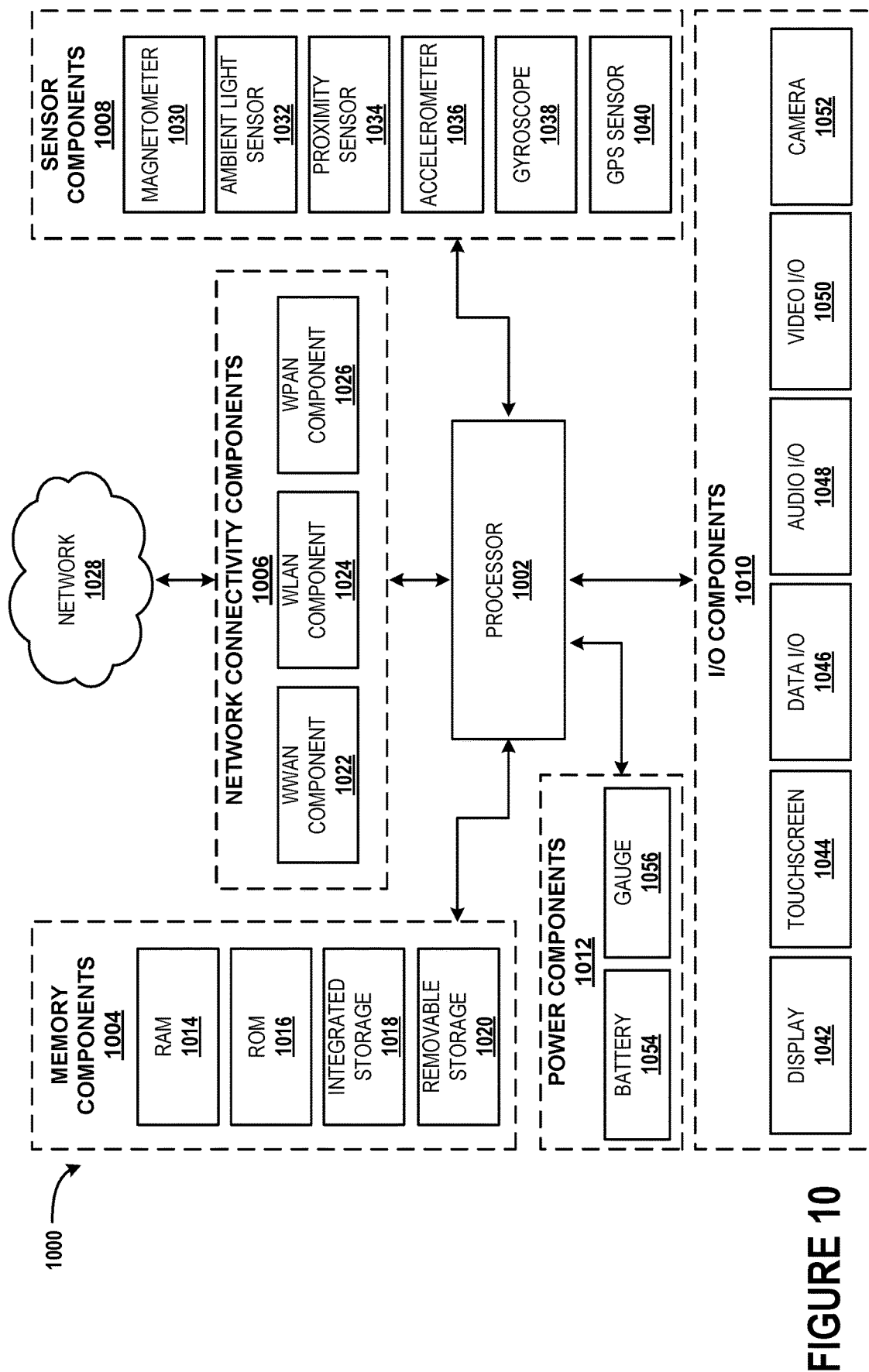
FIG. 10 is a computer architecture diagram illustrating a computing device architecture capable of implementing aspects of the examples presented herein.

Turning now to FIG. 10, an illustrative computing device architecture 1000 for a computing device that is capable of executing various software components described herein for a health monitor that establishes and monitors a set of health monitor endpoints to be used as substitutes for working window endpoints is described. The computing device architecture 1000 is applicable to computing devices that facilitate mobile computing due, in part, to form factor, wireless connectivity, and/or battery-powered operation. In some examples, the computing devices include, but are not limited to, mobile telephones, tablet devices, slate devices, portable video game devices, and the like. Moreover, the computing device architecture 1000 is applicable to any of the clients 906 shown in FIG. 9. Furthermore, aspects of the computing device architecture 1000 can be applicable to traditional desktop computers, portable computers (e.g., laptops, notebooks, ultra-portables, and netbooks), server computers, and other computer systems, such as described herein with reference to FIG. 6. For example, the single touch and multi-touch aspects disclosed herein below can be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated example, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some examples, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 can be utilized to execute aspects of the software components presented herein and, particularly, those that utilize, at least in part, a touch-enabled input.

In some examples, the processor 1002 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720p, 1080p, and greater), video games, three-dimensional modeling applications, and the like. In some examples, the processor 1002 is configured to communicate with a discrete GPU (not shown). In any case, the CPU and GPU can be configured in accordance with a co-processing CPU/GPU computing model, wherein the sequential part of an application executes on the CPU and the computationally-intensive part is accelerated by the GPU.

In some examples, the processor 1002 is, or is included in, a system-on-chip ("SoC") along with one or more of the other components described herein below. For example, the SoC can include the processor 1002, a GPU, one or more of the network connectivity components 1006, and one or more of the sensor components 1008. In some examples, the processor 1002 is fabricated, in part, utilizing a package-on-package ("PoP") integrated circuit packaging technique. Moreover, the processor 1002 can be a single core or multi-core processor.

The processor 1002 can be created in accordance with an ARM architecture, available for license from ARM HOLDINGS of Cambridge, United Kingdom. Alternatively, the processor 1002 can be created in accordance with an x86 architecture, such as is available from INTEL CORPORATION of Mountain View, Calif. and others. In some examples, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some examples, the RAM 1014 or a portion thereof, the ROM 1016 or a portion thereof, and/or some combination the RAM 1014 and the ROM 1016 is integrated in the processor 1002. In some examples, the ROM 1016 is configured to store a firmware, an operating system or a portion thereof (e.g., operating system kernel), and/or a bootloader to load an operating system kernel from the integrated storage 1018 or the removable storage 1020.

The integrated storage 1018 can include a solid-state memory, a hard disk, or a combination of solid-state memory and a hard disk. The integrated storage 1018 can be soldered or otherwise connected to a logic board upon which the processor 1002 and other components described herein also can be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some examples, the removable storage 1020 is provided in lieu of the integrated storage 1018. In other examples, the removable storage 1020 is provided as additional optional storage. In some examples, the removable storage 1020 is logically combined with the integrated storage 1018 such that the total available storage is made available and shown to a user as a total combined capacity of the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various examples, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from a network 1028, which can be a WWAN, a WLAN, or a WPAN. Although a single network 1028 is illustrated, the network connectivity components 1006 can facilitate simultaneous communication with multiple networks. For example, the network connectivity components 1006 can facilitate simultaneous communications with multiple networks via one or more of a WWAN, a WLAN, or a WPAN.

In some examples, the network 1028 can correspond to the network 104 and/or the network 704 illustrated and described in FIGS. 1 and 6-7. In some other examples, the network 1028 can include the network 104 illustrated and described with reference to FIGS. 1 and 6 and/or the network 704 illustrated and described in FIG. 7. In yet other examples, the network 1028 can provide access to the network 104 illustrated and described with reference to FIGS. 1 and 6 and/or the network 704 illustrated and described in FIG. 7.

The network 1028 can be a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1028 can utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1028 can be configured to provide voice and/or data communications with any combination of the above technologies. The network 1028 can be configured to or adapted to provide voice and/or data communications in accordance with future generation technologies.

In some examples, the WWAN component 1022 is configured to provide dual-multi-mode connectivity to the network 1028. For example, the WWAN component 1022 can be configured to provide connectivity to the network 1028, wherein the network 1028 provides service via GSM and UMTS technologies, or via some other combination of technologies. Alternatively, multiple WWAN components 1022 can be utilized to perform such functionality, and/or provide additional functionality to support other non-compatible technologies (i.e., incapable of being supported by a single WWAN component). The WWAN component 1022 can facilitate similar connectivity to multiple networks (e.g., a UMTS network and an LTE network).

The network 1028 can be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some examples, the WLAN is implemented utilizing one or more wireless WI-FI access points. In some examples, one or more of the wireless WI-FI access points are another computing device with connectivity to a WWAN that are functioning as a WI-FI hotspot. The WLAN component 1024 is configured to connect to the network 1028 via the WI-FI access points. Such connections can be secured via various encryption technologies including, but not limited, WI-FI Protected Access ("WPA"), WPA2, Wired Equivalent Privacy ("WEP"), and the like.

The network 1028 can be a WPAN operating in accordance with Infrared Data Association ("IrDA"), BLUETOOTH, wireless Universal Serial Bus ("USB"), Z-Wave, ZIGBEE, or some other short-range wireless technology. In some examples, the WPAN component 1026 is configured to facilitate communications with other devices, such as peripherals, computers, or other computing devices via the WPAN.

The sensor components 1008 include a magnetometer 1030, an ambient light sensor 1032, a proximity sensor 1034, an accelerometer 1036, a gyroscope 1038, and a Global Positioning System sensor ("GPS sensor") 1040. It is contemplated that other sensors, such as, but not limited to, temperature sensors or shock detection sensors, also can be incorporated in the computing device architecture 1000.

The magnetometer 1030 is configured to measure the strength and direction of a magnetic field. In some examples the magnetometer 1030 provides measurements to a compass application program stored within one of the memory components 1004 in order to provide a user with accurate directions in a frame of reference including the cardinal directions, north, south, east, and west. Similar measurements can be provided to a navigation application program that includes a compass component. Other uses of measurements obtained by the magnetometer 1030 are contemplated.

The ambient light sensor 1032 is configured to measure ambient light. In some examples, the ambient light sensor 1032 provides measurements to an application program stored within one the memory components 1004 in order to automatically adjust the brightness of a display (described below) to compensate for low-light and high-light environments. Other uses of measurements obtained by the ambient light sensor 1032 are contemplated.

The proximity sensor 1034 is configured to detect the presence of an object or thing in proximity to the computing device without direct contact. In some examples, the proximity sensor 1034 detects the presence of a user's body (e.g., the user's face) and provides this information to an application program stored within one of the memory components 1004 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 1034 are contemplated.

The accelerometer 1036 is configured to measure proper acceleration. In some examples, output from the accelerometer 1036 is used by an application program as an input mechanism to control some functionality of the application program. For example, the application program can be a video game in which a character, a portion thereof, or an object is moved or otherwise manipulated in response to input received via the accelerometer 1036. In some examples, output from the accelerometer 1036 is provided to an application program for use in switching between landscape and portrait modes, calculating coordinate acceleration, or detecting a fall. Other uses of the accelerometer 1036 are contemplated.

The gyroscope 1038 is configured to measure and maintain orientation. In some examples, output from the gyroscope 1038 is used by an application program as an input mechanism to control some functionality of the application program. For example, the gyroscope 1038 can be used for accurate recognition of movement within a three-dimensional environment of a video game application or some other application. In some examples, an application program utilizes output from the gyroscope 1038 and the accelerometer 1036 to enhance control of some functionality of the application program. Other uses of the gyroscope 1038 are contemplated.

The GPS sensor 1040 is configured to receive signals from GPS satellites for use in calculating a location. The location calculated by the GPS sensor 1040 can be used by any application program that requires or benefits from location information. For example, the location calculated by the GPS sensor 1040 can be used with a navigation application program to provide directions from the location to a destination or directions from the destination to the location. Moreover, the GPS sensor 1040 can be used to provide location information to an external location-based service, such as E911 service. The GPS sensor 1040 can obtain location information generated via WI-FI, WIMAX, and/or cellular triangulation techniques utilizing one or more of the network connectivity components 1006 to aid the GPS sensor 1040 in obtaining a location fix. The GPS sensor 1040 can also be used in Assisted GPS ("A-GPS") systems.

The I/O components 1010 include a display 1042, a touchscreen 1044, a data I/O interface component ("data I/O") 1046, an audio I/O interface component ("audio I/O") 1048, a video I/O interface component ("video I/O") 1050, and a camera 1052. In some examples, the display 1042 and the touchscreen 1044 are combined. In some examples two or more of the data I/O component 1046, the audio I/O component 1048, and the video I/O component 1050 are combined. The I/O components 1010 can include discrete processors configured to support the various interface described below, or can include processing functionality built-in to the processor 1002.

The display 1042 is an output device configured to present information in a visual form. In particular, the display 1042 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some examples, the display 1042 is a liquid crystal display ("LCD") utilizing any active or passive matrix technology and any backlighting technology (if used). In some examples, the display 1042 is an organic light emitting diode ("OLED") display. Other display types are contemplated.

The touchscreen 1044 is an input device configured to detect the presence and location of a touch. The touchscreen 1044 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some examples, the touchscreen 1044 is incorporated on top of the display 1042 as a transparent layer to enable a user to use one or more touches to interact with objects or other information presented on the display 1042. In other examples, the touchscreen 1044 is a touch pad incorporated on a surface of the computing device that does not include the display 1042. For example, the computing device can have a touchscreen incorporated on top of the display 1042 and a touch pad on a surface opposite the display 1042.

In some examples, the touchscreen 1044 is a single-touch touchscreen. In other examples, the touchscreen 1044 is a multi-touch touchscreen. In some examples, the touchscreen 1044 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 1044. As such, a developer can create gestures that are specific to a particular application program.

In some examples, the touchscreen 1044 supports a tap gesture in which a user taps the touchscreen 1044 once on an item presented on the display 1042. The tap gesture can be used for various reasons including, but not limited to, opening or launching whatever the user taps. In some examples, the touchscreen 1044 supports a double tap gesture in which a user taps the touchscreen 1044 twice on an item presented on the display 1042. The double tap gesture can be used for various reasons including, but not limited to, zooming in or zooming out in stages. In some examples, the touchscreen 1044 supports a tap and hold gesture in which a user taps the touchscreen 1044 and maintains contact for at least a pre-defined time. The tap and hold gesture can be used for various reasons including, but not limited to, opening a context-specific menu.

In some examples, the touchscreen 1044 supports a pan gesture in which a user places a finger on the touchscreen 1044 and maintains contact with the touchscreen 1044 while moving the finger on the touchscreen 1044. The pan gesture can be used for various reasons including, but not limited to, moving through screens, images, or menus at a controlled rate. Multiple finger pan gestures are also contemplated. In some examples, the touchscreen 1044 supports a flick gesture in which a user swipes a finger in the direction the user wants the screen to move. The flick gesture can be used for various reasons including, but not limited to, scrolling horizontally or vertically through menus or pages. In some examples, the touchscreen 1044 supports a pinch and stretch gesture in which a user makes a pinching motion with two fingers (e.g., thumb and forefinger) on the touchscreen 1044 or moves the two fingers apart. The pinch and stretch gesture can be used for various reasons including, but not limited to, zooming gradually in or out of a website, map, or picture.

Although the above gestures have been described with reference to the use one or more fingers for performing the gestures, other appendages such as toes or objects such as styluses can be used to interact with the touchscreen 1044. As such, the above gestures should be understood as being illustrative and should not be construed as being limiting in any way.

The data I/O interface component 1046 is configured to facilitate input of data to the computing device and output of data from the computing device. In some examples, the data I/O interface component 1046 includes a connector configured to provide wired connectivity between the computing device and a computer system, for example, for synchronization operation purposes. The connector can be a proprietary connector or a standardized connector such as USB, micro-USB, mini-USB, or the like. In some examples, the connector is a dock connector for docking the computing device with another device such as a docking station, audio device (e.g., a digital music player), or video device.

The audio I/O interface component 1048 is configured to provide audio input and/or output capabilities to the computing device. In some examples, the audio I/O interface component 1046 includes a microphone configured to collect audio signals. In some examples, the audio I/O interface component 1046 includes a headphone jack configured to provide connectivity for headphones or other external speakers. In some examples, the audio interface component 1048 includes a speaker for the output of audio signals. In some examples, the audio I/O interface component 1046 includes an optical audio cable out.

The video I/O interface component 1050 is configured to provide video input and/or output capabilities to the computing device. In some examples, the video I/O interface component 1050 includes a video connector configured to receive video as input from another device (e.g., a video media player such as a DVD or BLURAY player) or send video as output to another device (e.g., a monitor, a television, or some other external display). In some examples, the video I/O interface component 1050 includes a High-Definition Multimedia Interface ("HDMI"), mini-HDMI, micro-HDMI, DisplayPort, or proprietary connector to input/output video content. In some examples, the video I/O interface component 1050 or portions thereof is combined with the audio I/O interface component 1048 or portions thereof.

The camera 1052 can be configured to capture still images and/or video. The camera 1052 can utilize a charge coupled device ("CCD") or a complementary metal oxide semiconductor ("CMOS") image sensor to capture images. In some examples, the camera 1052 includes a flash to aid in taking pictures in low-light environments. Settings for the camera 1052 can be implemented as hardware or software buttons.

Although not illustrated, one or more hardware buttons can also be included in the computing device architecture 1000. The hardware buttons can be used for controlling some operational aspect of the computing device. The hardware buttons can be dedicated buttons or multi-use buttons. The hardware buttons can be mechanical or sensor-based.

The illustrated power components 1012 include one or more batteries 1054, which can be connected to a battery gauge 1056. The batteries 1054 can be rechargeable or disposable. Rechargeable battery types include, but are not limited to, lithium polymer, lithium ion, nickel cadmium, and nickel metal hydride. Each of the batteries 1054 can be made of one or more cells.

The battery gauge 1056 can be configured to measure battery parameters such as current, voltage, and temperature. In some examples, the battery gauge 1056 is configured to measure the effect of a battery's discharge rate, temperature, age and other factors to predict remaining life within a certain percentage of error. In some examples, the battery gauge 1056 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 1012 can also include a power connector, which can be combined with one or more of the aforementioned I/O components 1010. The power components 1012 can interface with an external power system or charging equipment via a power I/O component 1044.

The disclosure presented herein also encompasses the subject matter set forth in the following clauses:

Clause 1. A computer-implemented method, comprising: establishing a set of substitution endpoints as substitutes for working window endpoints; receiving a notification at a health monitor that a working window endpoint is to be substituted; identifying at least one of the substitution endpoints to substitute for the working window endpoint; and releasing the identified at least one of the substitution endpoints as a substitute for the working window endpoint.

Clause 2. The computer-implemented method of clause 1, further comprising: receiving a target number of substitution endpoints from a request manager; and identifying a set of idle health monitor endpoints based on the target number of substitution endpoints.

Clause 3. The computer-implemented method of clause 1 and 2, wherein the target number of substitution endpoints comprises a count of the working window endpoints.

Clause 4. The computer-implemented method of clauses 1 through 3, wherein the target number of substitution endpoints comprises a desired bandwidth capability or processing capability of the working window endpoints.

Clause 5. The computer-implemented method of clauses 1 through 4, further comprising setting the health monitor to an active state after receiving the notification that one of the working window endpoints is to be substituted.

Clause 6. The computer-implemented method of clauses 1 through 5, further comprising setting the health monitor to an idle state after releasing the at least one of the substitution endpoints as a substitute for the working window endpoint.

Clause 7. The computer-implemented method of clauses 1 through 6, further comprising checking the health monitor endpoints by: receiving an awake message at the health monitor to switch the health monitor from an idle state to an active state; determining an endpoint iteration to query; sending a status request to substitution endpoints in the endpoint iteration to query; receiving a status from the substitution endpoints in the endpoint iteration to query; updating the status of the substitution endpoints in the endpoint iteration to query; and returning the health monitor to an idle state.

Clause 8. The computer-implemented method of clauses 1 through 7, wherein the endpoint iteration comprises a portion of the substitution endpoints to be checked in parallel.

Clause 9. The computer-implemented method of clauses 1 through 8, further comprising: increasing a frequency of the awake message to check substitution that have changed from a dead status to an alive status between one of a plurality of status checks; and decreasing the frequency of the awake message to check substitution endpoints that have not changed from a dead status to an alive status between the one of the plurality of status checks.

Clause 10. The computer-implemented method of clauses 1 through 9, wherein the frequency is increased up to a maximum period between the plurality of status checks.

Clause 11. A computing system, comprising: a processor; and a computer-readable storage medium having computer-executable instructions stored thereupon which, when executed on the processor, cause the processor to provide a request manager configured to establish a target number of substitution endpoints, and transmit a request to a health monitor to release a substitution endpoint of a plurality of health monitor endpoints to the request manager to substitute a working window endpoint of the working window endpoints with the substitution endpoint that was released, and provide the health monitor configured to establish the substitution endpoints based on the target number of substitution endpoints, receive the request to release the substitution endpoint, identify at least one of the plurality of substitution endpoints as the health monitor endpoint to be released, and release the identified substitution endpoint to the request manager.

Clause 12. The system of clause 11, wherein the request manager is further configured to monitor the working window endpoints.

Clause 13. The system of clauses 11 and 12, wherein the health monitor is further configured to monitor the substitution endpoints by: receiving an awake message at the health monitor to switch the health monitor from an idle state to an active state; determining an endpoint iteration to query; sending a status request to substitution endpoints in the endpoint iteration to query; receiving a status from the substitution endpoints in the endpoint iteration to query; updating the status of the substitution endpoints in the endpoint iteration to query; and returning the health monitor to an idle state.

Clause 14. The system of clauses 11 through 13, wherein determine which of the plurality of substitution endpoints is the health monitor endpoint to be released comprises determining a best substitution endpoint based on a geographic location of the working window to be substituted, a processing capability of the best substitution endpoint, or an available bandwidth of the best substitution endpoint.

Clause 15. The system of clauses 11 through 14, wherein the health monitor is configured to return to an idle status after release the health monitor endpoint to the request manager or after a status check of the health monitor endpoints.

Clause 16. The system of clauses 11 through 15, wherein the target number of substitution endpoints comprises a count of the working window endpoints.

Clause 17. The system of clauses 11 through 16, wherein the target number of substitution endpoints comprises a desired bandwidth capability or processing capability of the working window endpoints.

Clause 18. The system of clauses 11 through 17, wherein the health monitor is further configured to transmit an available message to the request manager to notify the request manager that a number of the substitution endpoints available for substitution has increased from zero to at least one.

Clause 19. A computer-implemented method, comprising: providing a request manager configured to monitor working window endpoints, establish a target number of substitution endpoints, and transmit a request to a health monitor to release a substitution endpoint of a plurality of substitution endpoints to the request manager to substitute a working window endpoint of the working window endpoints with the health substitution endpoint that was released; and providing the health monitor configured to establish the plurality of substitution endpoints based on the target number of substitution endpoints, receive the request to release the substitution endpoint of the plurality of substitution endpoints, identify the substitution endpoint of the plurality of substitution endpoints to be released, release the identified substitution endpoint to the request manager, and transmit an available message to the request manager to notify the request manager that a number of the substitution endpoints available for substitution has increased from zero to at least one.

Clause 20. The computer-implemented method of clause 19, wherein the health monitor is further configured to monitor the substitution endpoints by: receiving an awake message at the health monitor to switch the health monitor from an idle state to an active state; determining an endpoint iteration to query; sending a status request to the substitution endpoints in the endpoint iteration to query; receiving a status from the substitution endpoints in the endpoint iteration to query; updating the status of the substitution endpoints in the endpoint iteration to query; and returning the health monitor to an idle state.

Based on the foregoing, it should be appreciated that technologies for a health monitor that establishes and monitors a set of alive endpoints to be used as substitutes for a dead working window endpoints have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example examples and applications illustrated and described, and without departing from the true spirit and scope of the present invention, which is set forth in the following claims.

We claim:

1. A computer-implemented method for maintaining a plurality of idle substitution endpoints as substitutes for working window endpoints, the method comprising:

in response to receiving an awake message:
  switching a health monitor from a first state to a second state,
  performing, with the health monitor, a first status check by:
    determining an endpoint iteration to query, wherein the endpoint iteration includes at least a portion of the plurality of idle substitution endpoints,
    sending a status request to each of the idle substitution endpoints in the endpoint iteration,
    receiving a response to the status request from each of the idle substitution endpoints in the endpoint iteration,
    updating a status maintained by the health monitor of each of the idle substitution endpoints in the endpoint iteration based on the response to the status request received from each of the idle substitution endpoints in the endpoint iteration, and
    returning the health monitor to the first state, and
in response to an idle substitution endpoint included in the endpoint iteration changing from a dead status to an alive status between the first status check and a second status check, increasing a frequency of status checks for the idle substitution endpoint.

2. The computer-implemented method of claim 1, wherein sending the status request to each of the idle substitution endpoints in the endpoint iteration includes sending the status request to each of the idle substitution endpoints in the endpoint iteration in parallel.

3. The computer-implemented method of claim 1, further comprising
  establishing the plurality of idle substitution endpoints as substitutes for the working window endpoints;
  receiving a notification that one of the working window endpoints is to be substituted;
  identifying at least one of the plurality of idle substitution endpoints to substitute for the one of the working window endpoints based on the statuses maintained by the health monitor; and
  releasing the identified at least one of the plurality of idle substitution endpoints as a substitute for the one of the working window endpoints.

4. The computer-implemented method of claim 3, wherein establishing the plurality of idle substitution endpoints as substitutes for the working window endpoints includes
  receiving a target number of idle substitution endpoints; and
  identifying a set of health monitor endpoints as the plurality of idle substitution endpoints based on the target number of idle substitution endpoints, wherein the health monitor endpoints are endpoints available for selection as idle substitution endpoints.

5. The computer-implemented method of claim 4, wherein the target number of idle substitution endpoints comprises a count of the working window endpoints.

6. The computer-implemented method of claim 4, wherein the target number of idle substitution endpoints comprises at least one selected from a group consisting of a desired bandwidth capability of the working window endpoints and a processing capability of the working window endpoints.

7. The computer-implemented method of claim 3, further comprising setting the health monitor to the second state after receiving the notification that one of the working window endpoints is to be substituted.

8. The computer-implemented method of claim 7, further comprising setting the health monitor to the first state after releasing the at least one of the plurality of idle substitution endpoints as the substitute for the one of the working window endpoints.

9. A computing system, comprising:
a processor; and
a computer-readable storage medium having computer-executable instructions stored thereupon,
the processor configured, via execution of the computer-executable instructions, to:
maintain a plurality of idle substitution endpoints as substitutes for working window endpoints by
in response to receiving an awake message:
switch a health monitor from a first state to a second state, and perform a first status check with the health monitor by:
determining an endpoint iteration to query, wherein the endpoint iteration includes at least a portion of the plurality of idle substitution endpoints,
sending a status request to each of the idle substitution endpoints in the endpoint iteration,
receiving a response to the status request from each of the idle substitution endpoints in the endpoint iteration, and
updating a status maintained by the health monitor of each of the idle substitution endpoints based on the response to the status request received from each of the idle substitution endpoints in the endpoint iteration, and
returning the health monitor to the first state, and
in response to an idle substitution endpoint included in the endpoint iteration not changing from a dead status to an alive status between the first status check and a second status check, decreasing the frequency of status checks for the idle substitution endpoint.

10. The system of claim 9, wherein the processor is further configured to monitor the working window endpoints.

11. The system of claim 9, wherein the processor is further configured to
establish the plurality of idle substitution endpoints based on a target number of idle substitution endpoints;
receive a request to release an idle substitution endpoint, and
in response to receiving the request to release an idle substitution endpoint:
set the health monitor to the second state,
identify at least one of the plurality of idle substitution endpoints to be released based on the statuses maintained by the health monitor, and
release the identified substitution endpoint.

12. The system of claim 11, wherein the processor is further configured to identify at least one of the plurality of idle substitution endpoints to be released for substituting one of the working window endpoints based on at least one selected from a group consisting of a geographic location of the working window endpoint to be substituted, a processing capability of the least one of the plurality of substitution endpoints, and an available bandwidth of the at least one of the plurality of idle substitution endpoints.

13. The system of claim 11, wherein the processor is further configured to return the health monitor to the first state after releasing the identified substitution endpoint.

14. The system of claim 11, wherein the target number of idle substitution endpoints comprises a count of the working window endpoints.

15. The system of claim 11, wherein the target number of idle substitution endpoints comprises at least one selected from a group consisting of a desired bandwidth capability of the working window endpoints and a processing capability of the working window endpoints.

16. The system of claim 11, wherein the processor is further configured to transmit an available message in response to a number of the plurality of idle substitution endpoints available for substitution increasing from zero to at least one.

17. Non-transitory computer-readable medium storing instructions that, when executed with an electronic processor, perform a set of functions, the set of functions comprising:
maintaining a plurality of idle substitution endpoints as substitutes for working window endpoints by
in response to receiving an awake message:
switch a health monitor from a first state to a second state, and perform a first status check with the health monitor by:
determining an endpoint iteration to query, the endpoint iteration includes at least a portion of the plurality of idle substitution endpoints,
sending a status request to each of the idle substitution endpoints in the endpoint iteration,
receiving a response to the status request from each of the idle substitution endpoints in the endpoint iteration,
updating a status maintained by the health monitor of each of the idle substitution endpoints based on the response to the status request received from each of the idle substitution endpoints in the endpoint iteration, and
returning the health monitor to the first state, and
adjusting a frequency of status checks performed by the health monitor based on whether an idle substitution endpoint included in the endpoint iteration changed statuses between the first status check and a second status check.

18. The non-transitory computer-readable medium of claim 17, the set of functions further comprising
establishing the plurality of idle substitution endpoints based on a target number of idle substitution endpoints,
receiving a request to release a substitution endpoint,
identifying a substitution endpoint of the plurality of idle substitution endpoints to be released based on the statuses maintained by the health monitor, and
releasing the identified substitution endpoint to replace one of the working window endpoints.

* * * * *